US012652639B2

(12) United States Patent
Zhou et al.

(10) Patent No.: US 12,652,639 B2
(45) Date of Patent: Jun. 9, 2026

(54) SYSTEM AND METHOD FOR POSITIONING

(71) Applicant: Samsung Electronics Co., Ltd., Suwon-si (KR)

(72) Inventors: Yuhan Zhou, San Diego, CA (US); Philippe Jean Marc Michel Sartori, Naperville, IL (US); Yaser Mohamed Mostafa Kamal Fouad, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 507 days.

(21) Appl. No.: 18/353,879

(22) Filed: Jul. 17, 2023

(65) Prior Publication Data

US 2024/0049163 A1     Feb. 8, 2024

Related U.S. Application Data

(60) Provisional application No. 63/443,947, filed on Feb. 7, 2023, provisional application No. 63/419,622, filed (Continued)

(51) Int. Cl.
| | |
|---|---|
| *H04W 64/00* | (2009.01) |
| *H04W 72/232* | (2023.01) |
| *H04W 72/25* | (2023.01) |

(52) U.S. Cl.
CPC ......... *H04W 64/00* (2013.01); *H04W 72/232* (2023.01); *H04W 72/25* (2023.01)

(58) Field of Classification Search
CPC .... H04W 64/00; H04W 72/25; H04W 72/232

(Continued)

(56) References Cited

U.S. PATENT DOCUMENTS 11,778,585 B2 * 10/2023 Wu ..................... H04L 27/0006
                                                              370/329
2020/0028648 A1    1/2020  Akkarakaran et al.
(Continued)

FOREIGN PATENT DOCUMENTS

WO      WO 2020/146838 A1    7/2020
WO      WO 2022/126496 A1    6/2022

OTHER PUBLICATIONS

"Discussion on potential solutions for sidelink positioning", 3$^{rd}$ Generation Partnership Project (3GPP) TSG RAN WG1 #109-e, R1-2203566, e-Meeting, May 9-20, 2022, 12 pages, www.3gpp.org.

(Continued)

*Primary Examiner* — Michael R Neff
(74) *Attorney, Agent, or Firm* — Womble Bond Dickinson (US) LLP

(57) ABSTRACT

A system and a method are disclosed for positioning. In some embodiments, the method includes transmitting, by a first User Equipment (UE): a first Positioning Reference Signal (PRS) transmission, and, immediately preceding the first PRS transmission, a duplicate of a symbol of the first PRS transmission, the duplicate and the first PRS transmission being in a same slot as: a second PRS transmission, multiplexed in time with the first PRS transmission, transmitted by a second UE, and, immediately preceding the second PRS transmission, a duplicate, of a symbol of the second PRS transmission, transmitted by the second UE.

20 Claims, 21 Drawing Sheets

Related U.S. Application Data on Oct. 26, 2022, provisional application No. 63/393,107, filed on Jul. 28, 2022.

(58) Field of Classification Search
USPC ...................................................... 455/456.2
See application file for complete search history.

(56) References Cited

U.S. PATENT DOCUMENTS

| | | | | |
|---|---|---|---|---|
| 2020/0052845 | A1* | 2/2020 | Chuang | H04L 5/0048 |
| 2020/0351815 | A1* | 11/2020 | Kim | G01S 11/04 |
| 2021/0050978 | A1* | 2/2021 | Manolakos | H04L 5/0051 |
| 2021/0112474 | A1* | 4/2021 | Manolakos | H04W 36/00692 |
| 2021/0360575 | A1* | 11/2021 | Abotabl | H04L 1/0003 |
| 2022/0229146 | A1 | 7/2022 | Ko et al. | |
| 2022/0279367 | A1* | 9/2022 | Hwang | H04W 24/08 |
| 2022/0279581 | A1 | 9/2022 | Baek et al. | |
| 2022/0416967 | A1* | 12/2022 | Bao | H04W 16/26 |

OTHER PUBLICATIONS

Dwivedi, S. et al., "Positioning in 5G networks", arXiv:2102.03361v1, Feb. 5, 2021, pp. 1-7.

Panzner, B. et al., "Coexistence of 5G Sidelink Communication and 5G Sidelink Positioning", 64th International Symposium ELMAR-2022, Sep. 12-14, 2022, Zadar Croatia, pp. 77-80, IEEE.

"Technical Specification Group Services and System Aspects; Enhancement of 3GPP support for V2X scenarios; Stage 1", 3rd Generation Partnership Project (3GPP) TS 22.186, V17.0.0, Release 17, Mar. 2022, pp. 1-18, 3GPP Organizational Partners, https://www.3gpp.org/ftp/Specs/archive/22_series/22.186/22186-h00.zip.

"Technical Specification Group Services and System Aspects; Service requirements for the 5G system; Stage 1", 3rd Generation Partnership Project (3GPP) TS 22.261, V18.6.1, Release 18, Jun. 2022, 114 pages, 3GPP Organizational Partners, https://www.3gpp.org/ftp/Specs/archive/22_series/22.261/22261-i61.zip.

"Technical Specification Group Radio Access Network; LTE Positioning Protocol (LPP)", 3rd Generation Partnership Project (3GPP) TS 37.355, V17.1.0, Release 17, Jun. 2022, 345 pages, 3GPP Organizational Partners, https://www.3gpp.org/ftp/Specs/archive/37_series/37.355/37355-h10.zip.

"Technical Specification Group Radio Access Network; NR; User Equipment (UE) radio transmission and reception; Part 1: Range 1 Standalone", 3rd Generation Partnership Project (3GPP) TS 38.101-1, V17.6.0, Release 17, Jun. 2022, 720 pages, 3GPP Organizational Partners, https://www.3gpp.org/ftp/Specs/archive/38_series/38.101-1/38101-1-h60.zip.

"LS reply to 3GPP RAN on requirements of in-coverage, partial coverage, and out-of-coverage positioning use cases", 3rd Generation Partnership Project (3GPP) TSG RAN Meeting #91e, RP-210040, Electronic Meeting, Mar. 16-26, 2021, pp. 1-5, https://www.3gpp.org/ftp/tsg_ran/TSG_RAN/TSGR_91e/LSin.

"Revised SID on Study on expanded and improved NR positioning", cl version of 3rd Generation Partnership Project (3GPP) TSG RAN Meeting #94-e, RP-213588, Electronic Meeting, Dec. 6-17, 2021, pp. 1-5, https://www.3gpp.org/ftp/TSG_RAN/TSG_RAN/TSGR_94e/Docs/RP-213588.zip.

"Revised SID on Study on expanded and improved NR positioning", rm version of 3rd Generation Partnership Project (3GPP) TSG RAN Meeting #94-e, RP-213588, Electronic Meeting, Dec. 6-17, 2021, pp. 1-5, https://www.3gpp.org/ftp/TSG_RAN/TSG_RAN/TSGR_94e/Docs/RP-213588.zip.

* cited by examiner

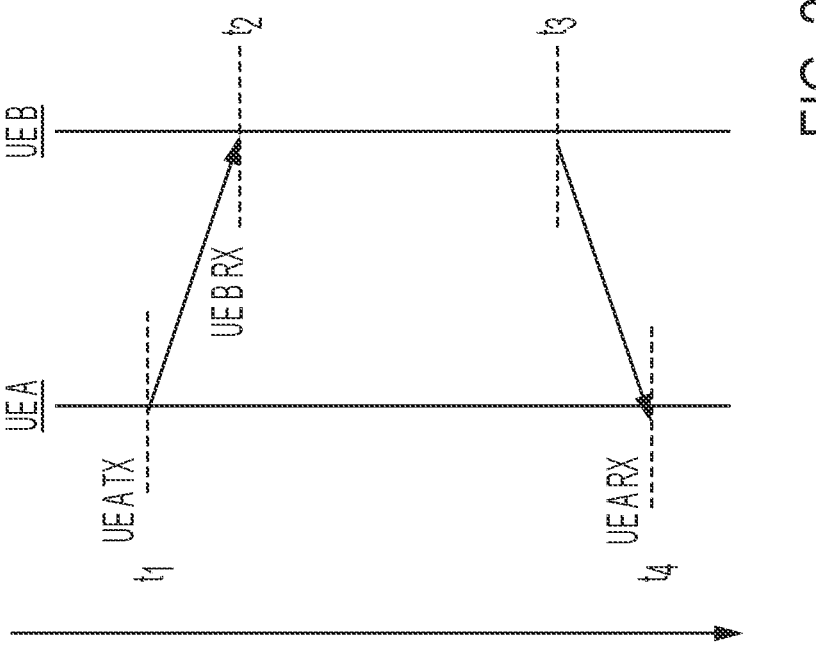
$$RTT = (t_2 - t_1) + (t_4 - t_3) = (t_4 - t_1) - (t_3 - t_2)$$
$t_1$ - Transmission Timing at UE A
$t_2$ - Reception Timing at UE B
$t_3$ - Transmission Timing at UE B
$t_4$ - Reception Timing at UE A
FIG. 2

FIG. 6

X slots

Data slot

PRS slot

Determine request to perform RTT  1405

Receive RTT measurements  1410

Compensate for mobility  1415

Determine location based on measurement with mobility compensation  1420

$RTT = (t_2 - t_1) + (t_4 - t_3) = (t_4 - t_1) - (t_3 - t_2)$ $t_1$ - Transmission Timing at UE A
$t_2$ - Reception Timing at UE B
$t_3$ - Transmission Timing at UE B
$t_4$ - Reception Timing at UE A

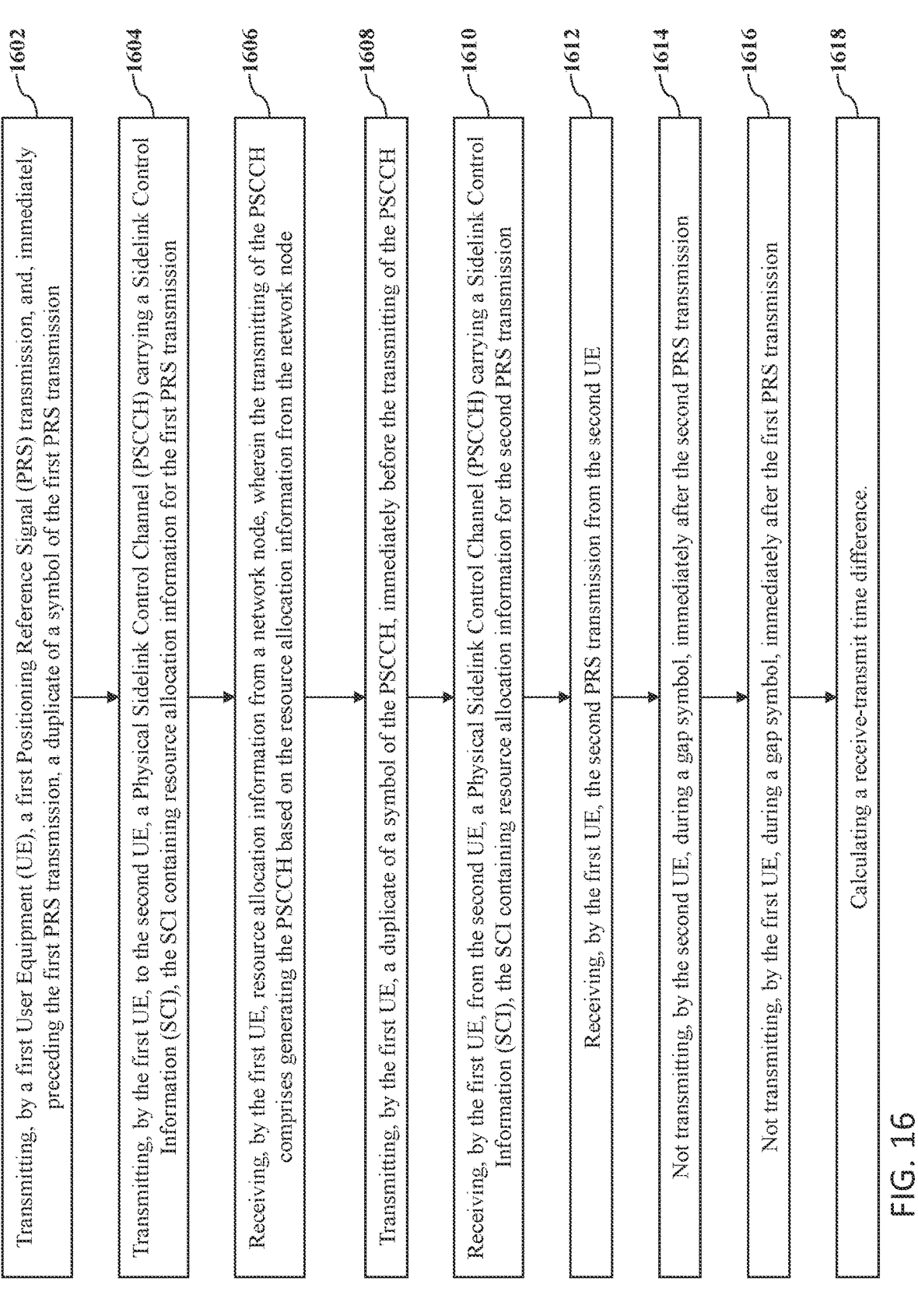

1602 — Transmitting, by a first User Equipment (UE), a first Positioning Reference Signal (PRS) transmission, and, immediately preceding the first PRS transmission, a duplicate of a symbol of the first PRS transmission 1604 — Transmitting, by the first UE, to the second UE, a Physical Sidelink Control Channel (PSCCH) carrying a Sidelink Control Information (SCI), the SCI containing resource allocation information for the first PRS transmission 1606 — Receiving, by the first UE, resource allocation information from a network node, wherein the transmitting of the PSCCH comprises generating the PSCCH based on the resource allocation information from the network node 1608 — Transmitting, by the first UE, a duplicate of a symbol of the PSCCH, immediately before the transmitting of the PSCCH 1610 — Receiving, by the first UE, from the second UE, a Physical Sidelink Control Channel (PSCCH) carrying a Sidelink Control Information (SCI), the SCI containing resource allocation information for the second PRS transmission 1612 — Receiving, by the first UE, the second PRS transmission from the second UE 1614 — Not transmitting, by the second UE, during a gap symbol, immediately after the second PRS transmission 1616 — Not transmitting, by the first UE, during a gap symbol, immediately after the first PRS transmission 1618 — Calculating a receive-transmit time difference.

SYSTEM AND METHOD FOR POSITIONING

CROSS-REFERENCE TO RELATED APPLICATION

This application claims the priority benefit under 35 U.S.C. § 119(e) of U.S. Provisional Application No. 63/393,107 filed on Jul. 28, 2022, and of U.S. Provisional Application No. 63/419,622 filed on Oct. 26, 2022, and of U.S. Provisional Application No. 63/443,947 filed on Feb. 7, 2023, the disclosure of each of which is incorporated by reference in its entirety as if fully set forth herein.

TECHNICAL FIELD

The disclosure generally relates to wireless communications. More particularly, the subject matter disclosed herein relates to improvements to a system and method for positioning in a wireless communication system.

SUMMARY

A wireless device (e.g., a User Equipment (UE)) operating in a wireless network may interact with a network node (gNB), to exchange data and to determine the position of the wireless device. In some circumstances, however, a wireless device may not be within range of any network node. To solve this problem, in some circumstances UEs may exchange data directly with each other. Such communications may be referred to as sidelink communications.

One issue with the above approach is that the position-estimating features provided by a gNB may also be unavailable when no gNB is within range.

To overcome these issues, systems and methods are described herein for sidelink positioning.

The above approaches improve on previous methods because they enable position estimation in the absence of a gNB.

According to an embodiment of the present disclosure, there is provided a method, including: transmitting, by a first User Equipment (UE): a first Positioning Reference Signal (PRS) transmission, and, immediately preceding the first PRS transmission, a duplicate of a symbol of the first PRS transmission, the duplicate and the first PRS transmission being in a same slot as: a second PRS transmission, multiplexed in time with the first PRS transmission, transmitted by a second UE, and, immediately preceding the second PRS transmission, a duplicate, of a symbol of the second PRS transmission, transmitted by the second UE.

In some embodiments, the method further includes transmitting, by the first UE, to the second UE, a Physical Sidelink Control Channel (PSCCH) carrying a Sidelink Control Information (SCI), the SCI containing resource allocation information for the first PRS transmission.

In some embodiments, the method further includes receiving, by the first UE, resource allocation information from a network node, wherein the transmitting of the PSCCH includes generating the PSCCH based on the resource allocation information from the network node.

In some embodiments, the method further includes transmitting, by the first UE, a duplicate of a symbol of the PSCCH, immediately before the transmitting of the PSCCH.

In some embodiments, the first PRS transmission begins three symbols or four symbols or five symbols after the duplicate of the symbol of the PSCCH.

In some embodiments, the SCI further contains resource allocation information for the second PRS transmission.

In some embodiments: the SCI further contains resource allocation information for the second PRS transmission and for a third PRS transmission; and the method further includes transmitting, by the first UE, two consecutive receive-transmit time difference measurements.

In some embodiments, the first PRS transmission and the third PRS transmission are for transmission by the first UE and the second PRS transmission is for transmission by the second UE.

In some embodiments, the first PRS transmission and the second PRS transmission are for transmission by the first UE and the third PRS transmission is for transmission by the second UE.

In some embodiments, the first PRS transmission is for transmission by the first UE and the second PRS transmission and the third PRS transmission are for transmission by the second UE.

In some embodiments, the method further includes receiving, by the first UE, from the second UE, a Physical Sidelink Control Channel (PSCCH) carrying a Sidelink Control Information (SCI), the SCI containing resource allocation information for the second PRS transmission.

In some embodiments, the method further includes receiving, by the first UE, the second PRS transmission from the second UE.

In some embodiments, the method further includes not transmitting, by the second UE, during a gap symbol, immediately after the second PRS transmission.

In some embodiments, the method further includes not transmitting, by the first UE, during a gap symbol, immediately after the first PRS transmission.

In some embodiments, the method further includes calculating a receive-transmit time difference as $T_{UE\text{-}RX}-T_{UE\text{-}TX}$, wherein: $T_{UE\text{-}RX}$ is the UE received timing of a first set PRS symbol of a first set sidelink subframe from a transmitting UE, defined by the first detected path in time; $T_{UE\text{-}TX}$ is the UE transmit timing of a second set PRS symbol of a second set sidelink subframe; and the second set PRS symbol is closest in time to the first set PRS symbol.

According to an embodiment of the present disclosure, there is provided a system, including, a first User Equipment (UE), including: one or more processors; and a memory storing instructions which, when executed by the one or more processors, cause performance of: transmitting, by the first UE: a first Positioning Reference Signal (PRS) transmission, and, immediately preceding the first PRS transmission, a duplicate of a symbol of the first PRS transmission, the duplicate and the first PRS transmission being in a same slot as: a second PRS transmission, multiplexed in time with the first PRS transmission, transmitted by a second UE, and, immediately preceding the second PRS transmission, a duplicate, of a symbol of the second PRS transmission, transmitted by the second UE.

In some embodiments, the instructions, when executed by the one or more processors, further cause performance of transmitting, by the first UE, to the second UE, a Physical Sidelink Control Channel (PSCCH) carrying a Sidelink Control Information (SCI), the SCI containing resource allocation information for the first PRS transmission.

In some embodiments, the instructions, when executed by the one or more processors, further cause performance of receiving, by the first UE, resource allocation information from a network node, wherein the transmitting of the PSCCH includes generating the PSCCH based on the resource allocation information from the network node.

In some embodiments, the instructions, when executed by the one or more processors, further cause performance of transmitting, by the first UE, a duplicate of a symbol of the PSCCH, immediately before the transmitting of the PSCCH.

According to an embodiment of the present disclosure, there is provided a system, including, a first User Equipment (UE), including: means for processing; and a memory storing instructions which, when executed by the means for processing, cause performance of: transmitting, by the first UE: a first Positioning Reference Signal (PRS) transmission, and, immediately preceding the first PRS transmission, a duplicate of a symbol of the first PRS transmission, the duplicate and the first PRS transmission being in a same slot as: a second PRS transmission, multiplexed in time with the first PRS transmission, transmitted by a second UE, and, immediately preceding the second PRS transmission, a duplicate, of a symbol of the second PRS transmission, transmitted by the second UE.

BRIEF DESCRIPTION OF THE DRAWINGS

In the following section, the aspects of the subject matter disclosed herein will be described with reference to exemplary embodiments illustrated in the figures, in which:

FIG. 2 illustrates a round trip time measurement principle, according to an embodiment;

FIG. 6 illustrates a slot structure, according to an embodiment;

FIG. 16 is a flowchart, according to an embodiment; and

DETAILED DESCRIPTION

Figure 1:
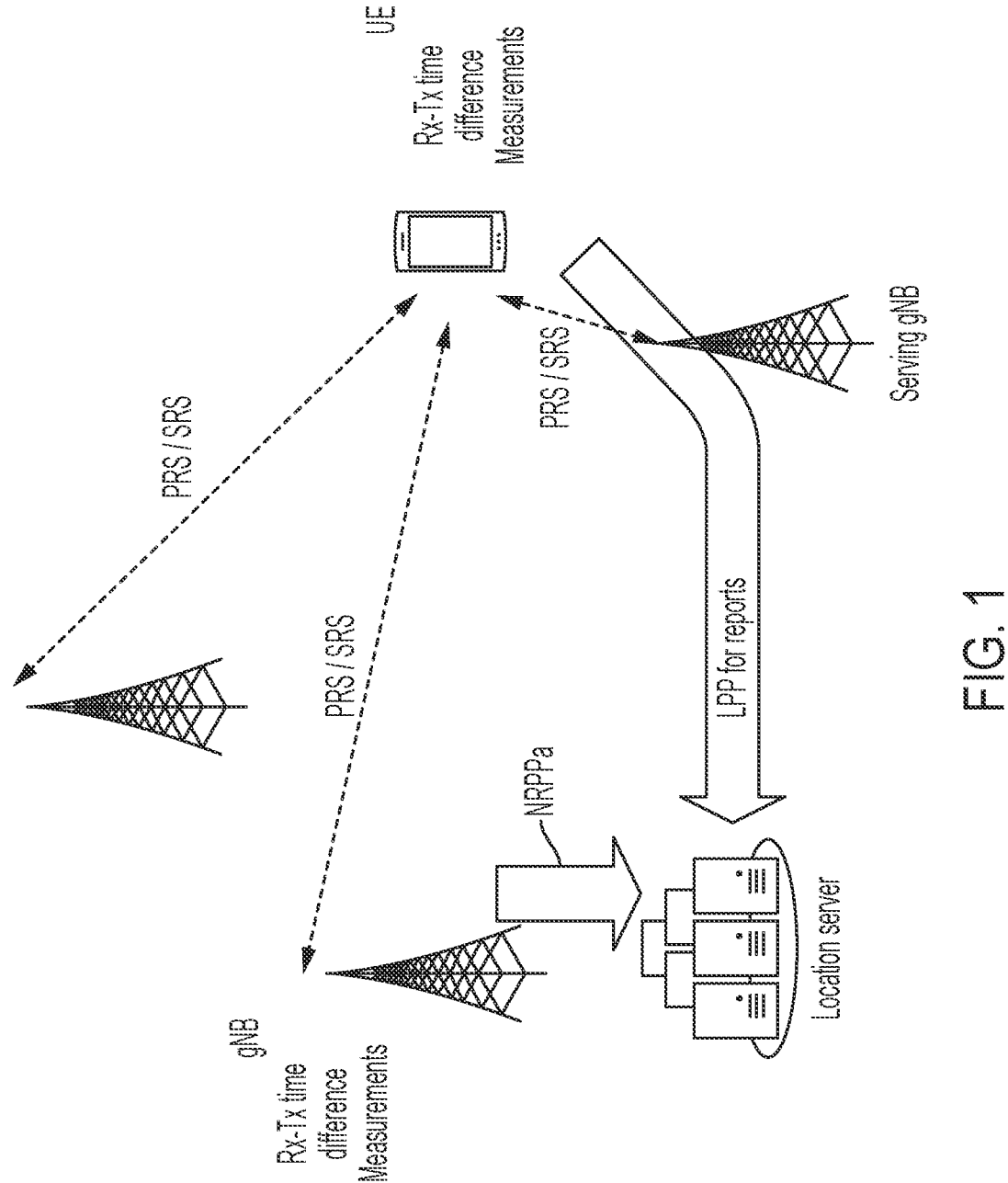
FIG. 1 illustrates the structure of Multi-cell RTT, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items. As used herein, the term "or" should be interpreted as "and/or", such that, for example, "A or B" means any one of "A" or "B" or "A and B".

The terms "first," "second," etc., as used herein, are used as labels for nouns that they precede, and do not imply any type of ordering (e.g., spatial, temporal, logical, etc.) unless explicitly defined as such (e.g., when qualified by "in order", as in the phrase "the first symbol, in order"). Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

In Rel-16/17, positioning for NR Link between the UTRAN (UMTS Terrestrial Radio Access Network) and the UE (the Uu link) was standardized for the cellular link. In Rel-18, positioning protocols will be studied and extended for the sidelink, as documented in RP-213588, "Revised SID on Study on expanded and improved NR positioning", 3GPP, RAN #94-e. For sidelink positioning, methods based on time difference may be difficult to enable since they may involve all UEs sharing the same absolute synchronization to be able to compute time differences using the same reference. For this reason, a RTT (round trip time) method is viewed as a promising solution for sidelink positioning. However, there are two issues with RTT for sidelink: (i) with imperfect frequency drift compensation, the carrier frequency offset (CFO) may be such that performance is degraded, and (ii) even with perfect frequency drift correction, RTT requires the exchange of several messages. Due to the UE mobility, especially for Vehicle-to-everything (V2X) applications, the accuracy may be degraded. As such, this disclosure presents solutions to perform fast RTT; a fast RTT protocol takes care of these two components by ensuring that neither the clock drift nor mobility will significantly degrade measurements.

Positioning requirements for sidelink may include the following. The positioning requirements in V2X depend on the service the UE operates. Also, the requirements are applicable to relative and absolute positioning depending on the use case or the positioning service level. In terms of the horizontal or lateral/longitudinal accuracy, the requirements for the absolute position or relative position may be categorized into three sets as follows by incorporating the requirements from the sources mentioned above:

Set 1: 10 m-50 m with 68%-95% confidence level. This includes Group 1 in RP-210040, "Reply LS to RP-201390 on requirements of in-coverage, partial coverage, and out-of-coverage positioning use cases," (source: 5GAA), and Service level 1 in TS 22.261, "Service requirements for the 5G system", 3GPP.

Set 2: 1 m-3 m with 95%-99% confidence level. This includes Group 2 in RP-210040, "Reply LS to RP-201390 on requirements of in-coverage, partial coverage, and out-of-coverage positioning use cases," (source: 5GAA), Service level 2, 3, 4 in TS 22.261, "Service requirements for the 5G system", 3GPP.

Set 3: 0.1 m-0.5 m with 95%-99% confidence level. This includes Group 3 in RP-210040, "Reply LS to RP-201390 on requirements of in-coverage, partial coverage, and out-of-coverage positioning use cases," (source: 5GAA), Service level 5, 6, 7 in TS 22.261, "Service requirements for the 5G system", 3GPP, and the requirements in TS 22.186, "Enhancement of 3GPP support for V2X scenarios", 3GPP.

All the three sets are applicable for absolute positioning and relative positioning.

Requirements for other performance metrics are also defined in a range depending on the positioning service level in TS 22.261, ("Service requirements for the 5G system", 3GPP); 2 m-3 m (absolute) or 0.2 m (relative) vertical accuracy, 95%-99.9% positioning service availability, 10 ms-1 s positioning service latency.

Positioning service should be provided in indoor, outdoor, tunnel areas. A UE velocity of up to 250 km/h is to be supported for outdoor and tunnel areas. As long as the UE operates a V2X use case having the corresponding positioning requirements, the requirements should be fulfilled when the UE is inside the network coverage as well as when it is outside the network coverage. The requirements should be also fulfilled when the GNSS-based positioning is not available or not accurate enough.

Specifically, the 5G system shall be able to provide positioning services with the performance requirements reported in Table 7.3.2.2-1, which is copied from TS 22.261 Clause 7.3.2.2. Note: The requirements do not preclude any type of UE, including specific UE such as for example V2X, MTC.

For evaluation of V2X use-cases for SL positioning in Rel-18, the following accuracy requirements are considered for study:

Set A: Horizontal accuracy of 1.5 m (absolute and relative); vertical accuracy of 3 m (absolute and relative) for 90% of UEs Set B: Horizontal accuracy of 0.5 m (absolute and relative); vertical accuracy of 2 m (absolute and relative) for 90% of UEs In NR Rel-16, multi-RTT was standardized as a positioning solution. RTT (Round Trip Time) methods were studied in the literature, and Wi-Fi, in IEEE 802.11-REVmc, uses similar ideas to do indoor positioning. The general idea of the multi-cell RTT method is to estimate the RTT between a UE and multiple gNBs by transmitting and receiving signals between the necessary devices. The distances between the UE and the gNBs are then estimated using RTT. Then, similar to other timing-based techniques (e.g., DL-TDOA) a trilateration estimation algorithm may be used to estimate the position of the UE. In DL-TDOA one source of timing estimation error comes from the synchronization errors between the gNBs. The advantage of using the RTT to estimate the distance between a UE and a gNB is that these synchronization errors are no longer a factor. However, the cost of multi-RTT is the increased resource overhead due to the use of both DL RS and UL RS.

As part of the work in 3GPP, the UE Rx–Tx time difference and gNB Rx–Tx time difference measurements will be introduced. These measurements existed in LTE but were only for the serving cell when E-CID method is used while in NR they will also be defined for neighboring cells. FIG. 1 shows an overview of the structure for multi-RTT in Rel-16.

FIG. 2 illustrates a RTT mechanism that may be supported in NR for the link between two UEs. It is shown that the round trip delay time may be estimated by the UE Rx–Tx time differences measured at each UE. In the absence of imperfections, when measured at instant $t_2$, the RTT is:

$$RTT = 2 \cdot (t_2 - t_1)$$

Similarly, ignoring mobility, when measured at instant $t_4$, the RTT is:

$$RTT = 2 \cdot (t_4 - t_3)$$

Thus, by adding these two equations, and reorganizing the terms, the propagation delay T may be expressed as:

$$T = \frac{1}{2}RTT = \frac{1}{2}[(t_2 - t_1) + (t_4 - t_3)] = \frac{1}{2}[(t_4 - t_1) - (t_3 - t_2)]$$

This equation enables a simple way to compute the propagation delay T:

$(t_4 - t_1)$ may be computed by UE A alone
$(t_3 - t_2)$ may be computed by UE B alone Thus, if UE B reports $(t_3 - t_2)$ to UE A, the propagation delay T may be easily obtained. Furthermore, there is no need for absolute synchronization since only differences in timing are needed.

In practice, the clocks are not fully aligned, thus there is a time drift. As such:

$$\overline{t_4 - t_1} = (1 + e_A)(t_4 - t_1)$$

and $$\overline{t_3 - t_2} = (1 + e_B)(t_3 - t_2)$$

where the use of the accent indicates a measurement, and $e_A$ and $e_B$ are the clock drifts at UE A and UE B, respectively. Then $$\overline{RTT} = (1 + e_a)(t_4 - t_1) - (1 + e_b)(t_3 - t_2)$$

and $$\overline{RTT} - RTT = e_a(t_4 - t_1) - e_b(t_3 - t_2) = e_a RTT + (e_a - e_b)(t_3 - t_2)$$

The first term in the above equation is negligible because the RTT is in microseconds whereas t3–t2 is in milliseconds. As such:

$$\overline{RTT} - RTT \approx (e_a - e_b)(t_3 - t_2)$$

Per TS38.101, the UE clock accuracy is 0.1 ppm. Thus, the error due to clock drift on the propagation delay T is $$\text{error} = \hat{T} - T = \frac{1}{2}\left(\overline{RTT} - RTT\right) \approx \frac{1}{2}(e_a - e_b)(t_3 - t_2) = 10^{-7} \cdot (t_3 - t_2)$$

Thus, if $(t_3 - t_2) = 10$ ms, the evaluation of propagation delay T is off by 1 ns, or 30 cm.

Assuming a relative speed of 250 km/h between the two UEs, the relative distance varies by 70 m every second, or 70 cm per 10 ms. To provide horizontal measurements with a sufficient accuracy, this implies that the end-to-end RTT duration has to be less than 5 ms. Even at these values, when including both clock drift and impact of mobility, the horizontal accuracy requirements are barely met. Other impacts lowering accuracy (e.g., multipath, Doppler) are not included. Therefore, from this simple analysis, it is clear that there is a requirement for performing fast RTT.

Figure 3:
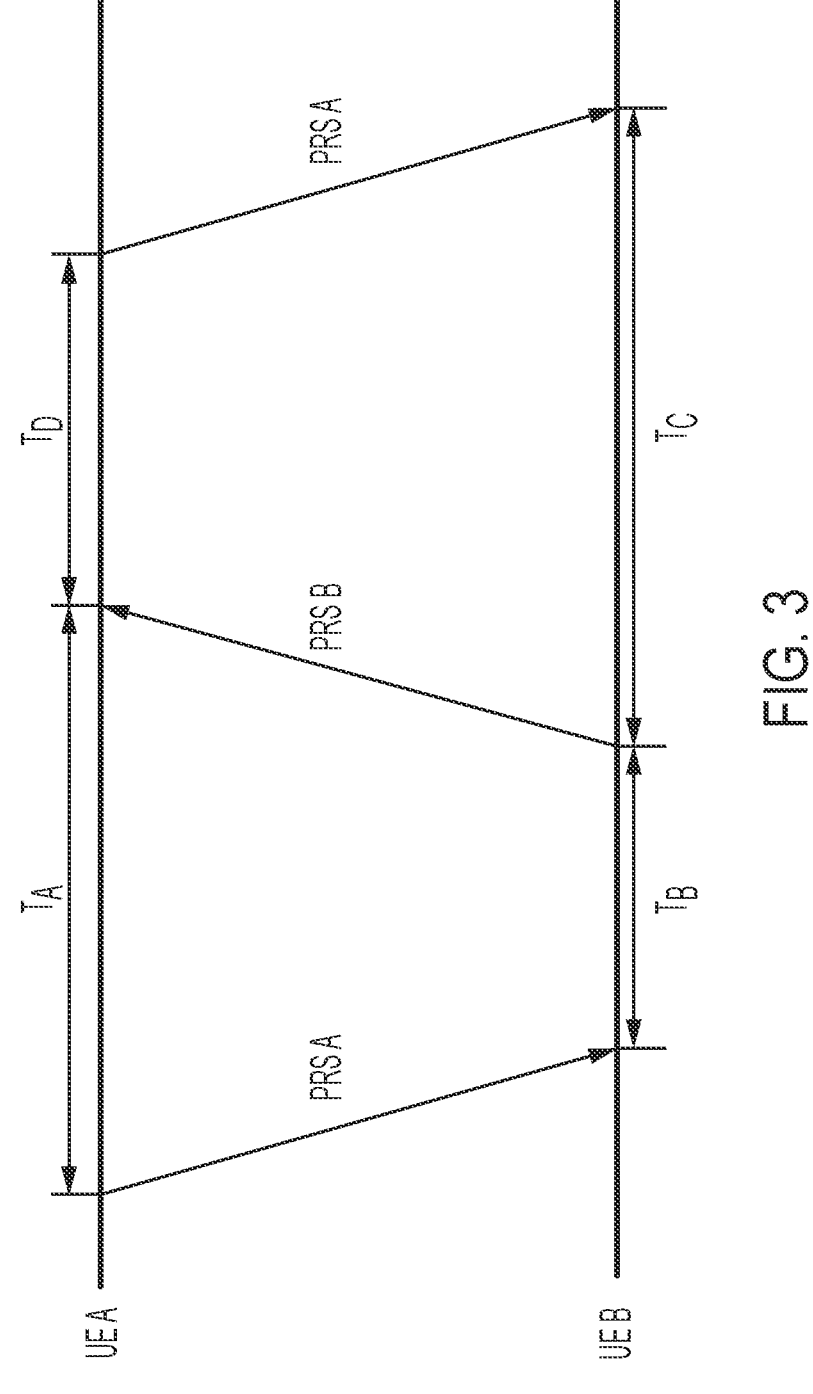
FIG. 3 illustrates a double sided round trip time measurement, according to an embodiment.

Double-side RTT is widely used for UWB positioning and may reduce the impact of clock drift. In FIG. 3 for example, the propagation delay T may be estimated by two UE time measurements as $$T = \frac{1}{4}[(T_A - T_B) + (T_C - T_D)] = \frac{1}{4}[(T_A - T_D) + (T_C - T_B)].$$

By taking the clock drift of UE A and UE B into account, the resulting propagation delay is:

$$\hat{T} = \frac{1}{4}[(T_A - T_D)(1 + e_A) + (T_C - T_B)(1 + e_B)]$$

where $e_A$ and $e_B$ are the clock drifts at UE A and UE B, respectively.

In this case, the error of propagation delay estimation due to clock error may be:

$$\text{error} = \hat{T} - T = \frac{1}{4}[e_A(T_A - T_D) + e_B(T_C - T_B)]$$

Replacing $T_A = T_B + 2T$ and $T_C = T_D + 2T$ results in $$\text{error} = \hat{T} - T = \frac{1}{4}[e_A(T_B + 2T - T_D) + e_B(T_D + 2T - T_B)] =$$

$$\frac{1}{4}(T_B - T_D)(e_A - e_B) + \frac{1}{2}(e_A + e_B)T \approx \frac{1}{4}(T_B - T_D)(e_A - e_B)$$

where
$e_A$ and $e_B$ is the clock offset of UE A and UE B, and T is the estimated propagation delay between UE A and UE B without clock drift.

Although double RTT is a way to mitigate clock drift, it lengthens the duration of the RTT process, and therefore may not be suitable for high-mobility cases. Furthermore, as it is shown in analysis, the double RTT may reduce the clock error under some condition, but it cannot eliminate the clock error completely. If the clock drift is small, the more efficient way for mitigating clock error is to reduce the UE Rx–Tx time measurement time.

When performing RTT positioning in high mobility conditions, such as sidelink V2X, the following issues may occur. (i) Loss of accuracy due to mobility: A car moving at 250 km/h moves at 7 m per 100 ms. A latency of 10 ms results in a positioning error of 0.7 m, which cannot satisfy the sidelink positioning Set B requirement (i.e., accuracy of 0.5 m) for V2X. (ii) Clock drift reducing positioning accuracy: with the current clock accuracy of 0.1 ppm per ms, mobility may significantly affect positioning measurement accuracy.

If the RTT procedure and measurements are performed within a relatively short duration, these two issues may be mitigated. Therefore, there is the need for a fast RTT protocol. This disclosure describes fast RTT (FRTT) for high mobility scenarios. Features disclosed include slot structure and positioning reference signal (PRS) resource allocation design for a FRTT method, UE procedures for receiving the PRS in the FRTT method, and positioning measurement reporting for the FRTT method.

In some embodiments, to reduce position estimation errors, the UEs perform their measurements in a very fast manner. There are two UEs, i.e., UE A (Anchor UE) and UE B (Target UE) considered in the scenario. For example, since the error is proportional to $(t_3-t_2)$, the second UE may transmit its own PRS as soon as possible after having received the PRS for UE A. Two solutions may be employed:

Scheme A: UE A and UE B transmit the PRS in the same slot

Scheme B: UEA and UE B transmit the PRS in adjacent slots

Both schemes are described in detail below.

Figure 4:
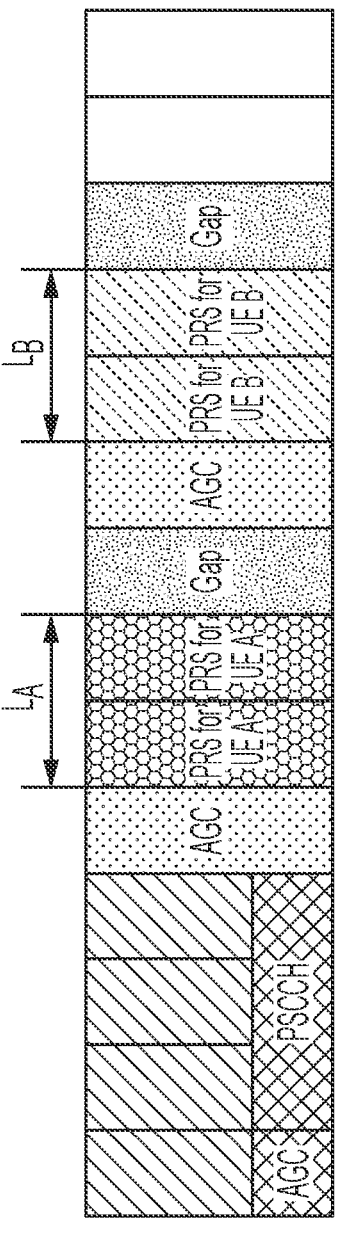
FIG. 4 illustrates a slot structure, according to an embodiment.

FIG. 4 shows a SL-PRS slot structure with SCI, in some embodiments. The structure includes a first AGC symbol, three symbols containing the PSCCH including the sidelink control information (SCI) for both UE A and UE B, a second AGC symbol, $L_A$ PRS symbols for UE A transmission, a first gap symbol, a third AGC symbol, and $L_B$ PRS symbols for UE B transmission, where $L_A$=1, 2, or 3, and $L_B$=1, 2, or 3, and a second gap symbol. The first AGC symbol may be a duplicate of any symbol of the PSCCH transmission, the second AGC symbol may be duplicate of any symbol of the first PRS transmission (or of any other symbol of the first PRS, if the second AGC symbol is considered to be part of the first PRS transmission) and the third AGC symbol may be a duplicate of any symbol of the second PRS transmission (or of any other symbol of the second PRS, if the third AGC symbol is considered to be part of the second PRS transmission).

In Scheme A, as mentioned above, UE A and UE B transmit the PRS in the same slot. To resolve the issue of UE high mobility and clock drifting, the UE Rx–Tx time difference may be made as small as possible. One solution (that of Scheme A) is to allocate the transmit PRS resources and reception PRS resources in the same slot. There are two options for the SL-PRS slot structures, which are referred to herein as Option 1 and Option 2.

Figure 5:
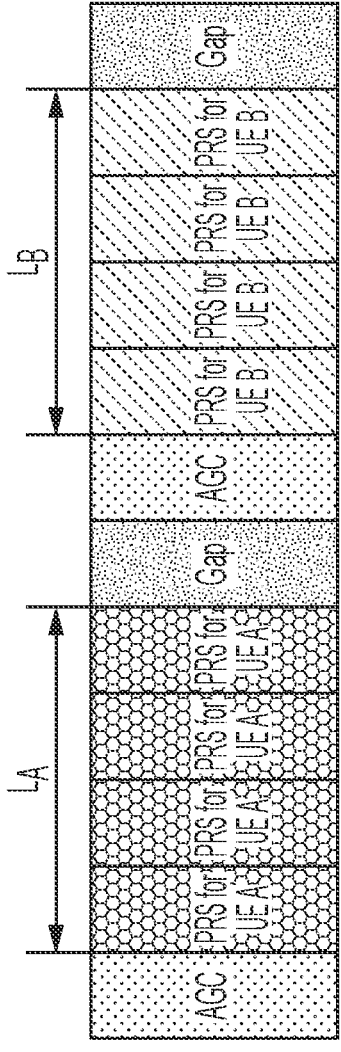
FIG. 5 illustrates a slot structure, according to an embodiment.

In Option 1, when there is a Sidelink Control Information SCI (PSCCH) in the PRS slot, the slot structure shown in FIG. 5 may be used. The AGC symbol is identical to the PRS symbol that follows it. The gap symbol allows a UE to switch from transmission to reception and vice versa. The first $L_A$ PRS symbols are for UE A transmission, and the following $L_B$ PRS symbols are for UE B transmission, where $L_A$=1, 2, or 3, and $L_B$=1, 2, or 3. The comb structure may be applied to PRS resources for UE multiplexing. There is no resource for data transmission in the PRS symbol (i.e., these symbols include only PRS signals). The PRS resource allocation for UE B (the target UE) is indicated by the SCI in the previous slot to make sure that there is enough time for UE B to decode the SCI.

Figure 6:
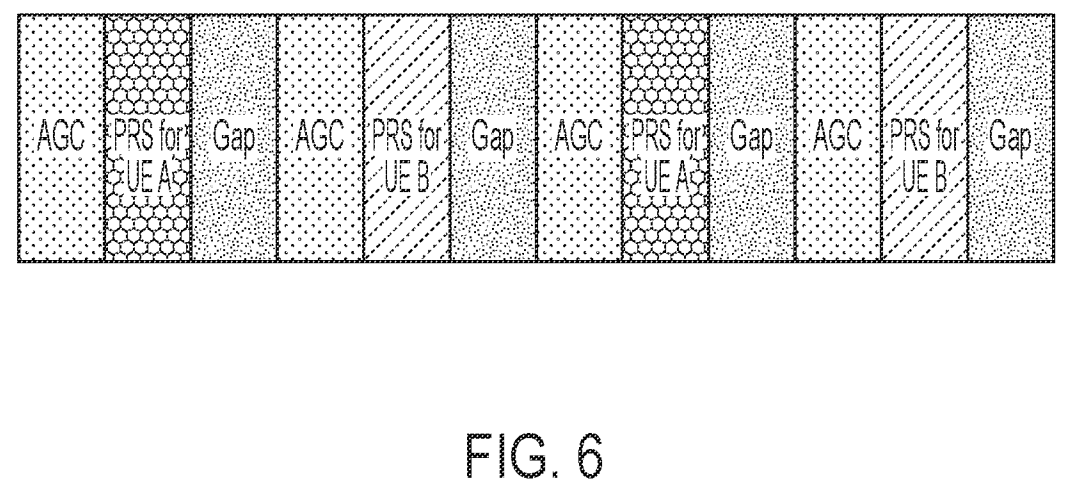

In Option 2, when there is no SCI (PSCCH) in the PRS slot, the slot structure, in some embodiments, is shown in FIG. 6. The AGC symbol is the repetition of the following PRS symbol. The first $L_A$ PRS symbols are for UE A transmission, and the following $L_B$ PRS symbols are for UE A transmission, where $L_A$=1, 2, 3, 4, and $L_B$=1, 2, 3, 4. The comb structure may be applied to PRS resources, and the comb size may be 1, 2, 3, and 4. For Option 2, the PRS slot is dedicated for positioning only and no data transmission is performed within this slot.

Figure 7:
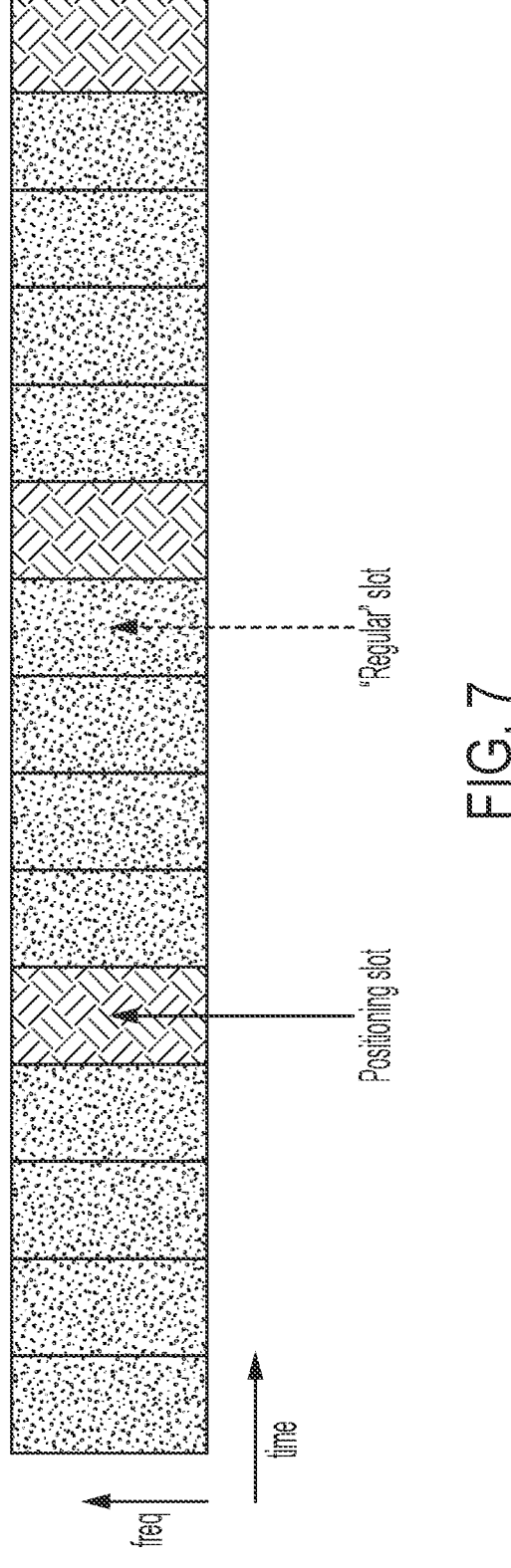
FIG. 7 illustrates an example of a reference signal resource pool, according to an embodiment.

The PRS symbols may also be allocated in the slot with repetition as shown in FIG. 6. In this case, both UE A and UE B may perform two measurements on UE Rx–Tx time. In the positioning slot, the PRS is transmitted. The positioning slot structure may be that shown in FIG. 7, wherein some sidelink slots for PRS transmission only and some slots are for sidelink data communications. The PSCCH is used to indicate which resources to use to transmit the PRS.

Figure 8:
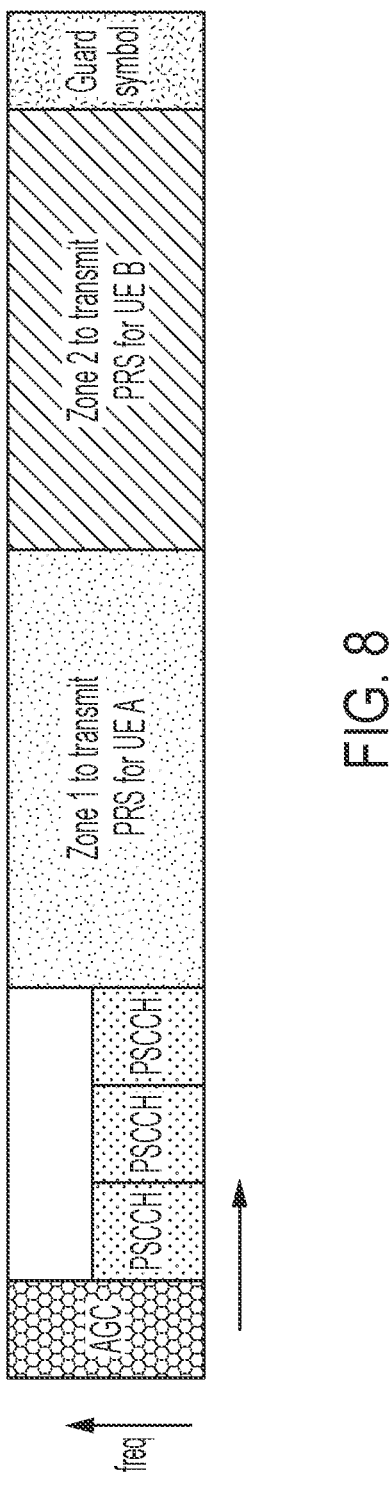
FIG. 8 illustrates an example of a slot structure, according to an embodiment.

Resources may be allocated for UE A and UE B in the zone to transmit the reference signal. For this reason, the zone is split into two subzones, as shown in FIG. 8, including a first zone $Z_1$ (or Z1), where UE A selects a resource (e.g., the first half of the zone), and a second zone $Z_2$ (or Z2), where UE B selects a resource (e.g., the second half of the zone).

A resource allocation resource protocol may be employed for UE A and UE B so that they both select resources in the same slot, with UE A selecting Z1 and UE B selecting Z2.

In some embodiments, the UE A directs the resource allocation for UE B. In such an embodiment, UE A selects a resource in Z1 and instructs UE B to select a resource in Z2. UE B follows the instructions of UE A and reports success/failure, depending on whether it may select a resource in Z2 or not. When resources are selected, the UEs may proceed with UE Rx–Tx time difference measurements. Alternatively, the selection of resources for UE B to transmit its reference signals may be completely done by UE A based on sensing. Subsequently, UE A may indicate the exact resources (e.g., the selected slot/zone and the reference signal index) that should be used by UE B for the transmission of its reference signal.

Figure 9A:
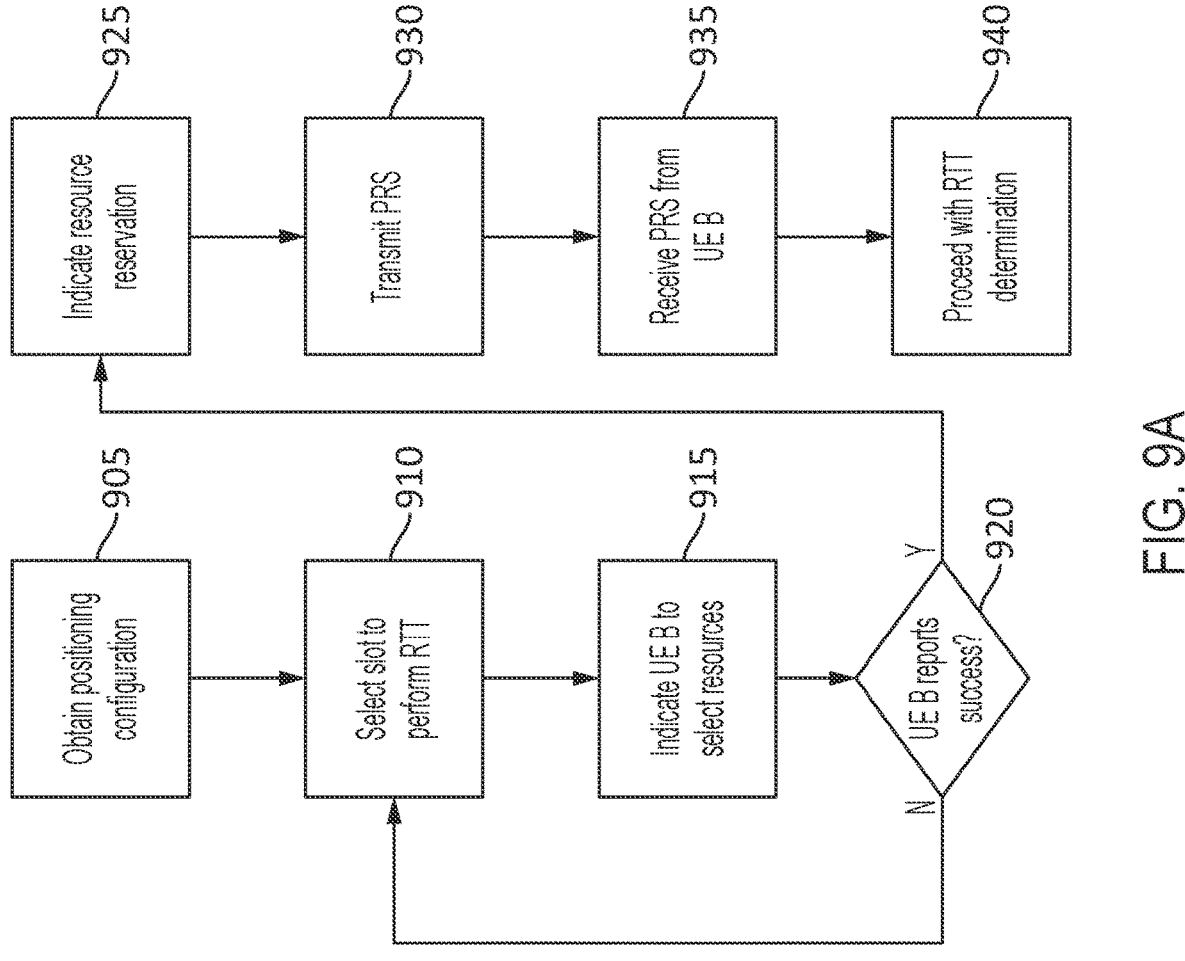
FIG. 9A illustrates UE operation for resource selection without inter-UE coordination, according to an embodiment.
Figure 9B:
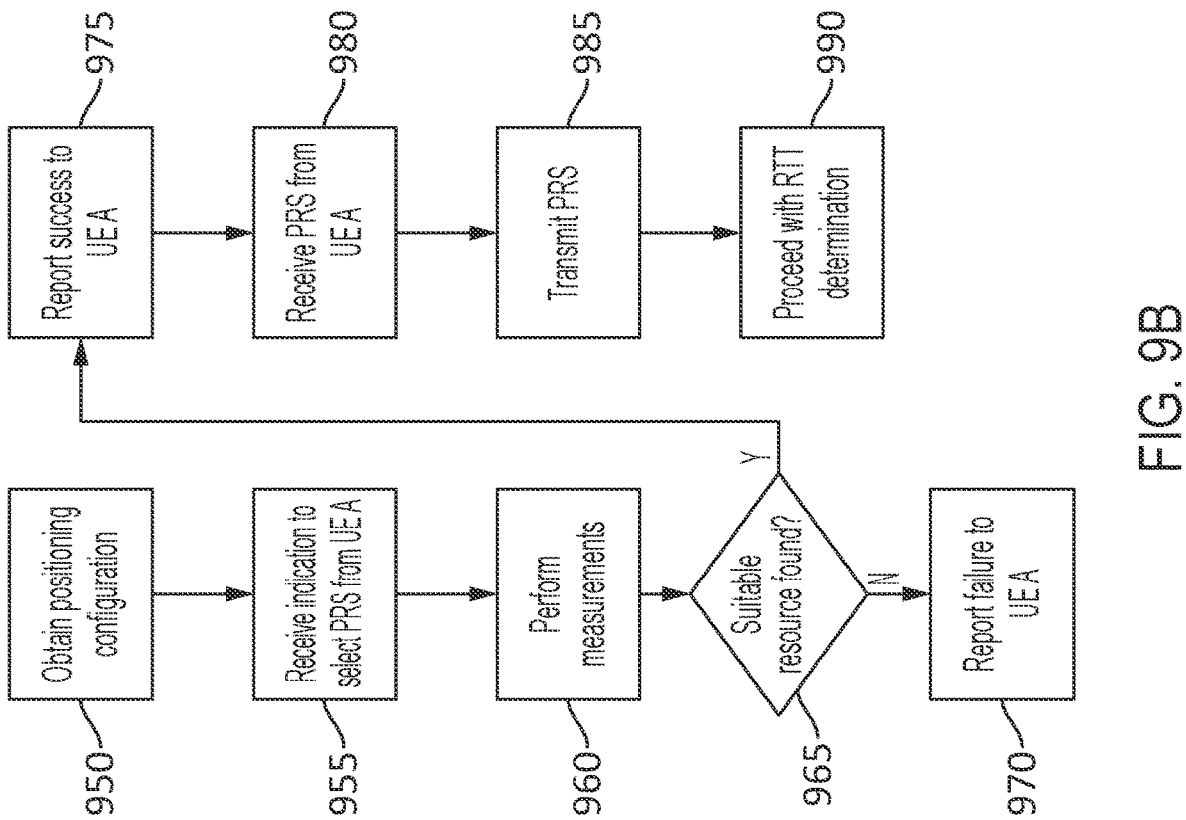
FIG. 9B illustrates UE operation for resource selection without inter-UE coordination, according to an embodiment.

More specifically, the UE operation for both UE A and UE B is shown in FIGS. 9A and 9B when UEs select their resources independently (i.e., without any inter-UE coordination). FIG. 9A shows the operation of UE A. At 905, it obtains a positioning configuration; it selects, at 910 a slot in which to perform RTT; it indicates, at 915, to UE B to select the resources; it determines, at 920, whether UE B has reported success (if it has, it proceeds to 925; if not, it returns to 910). It then indicates, at 925, a resource reservation; transmits, at 930, a first PRS; receives, at 935, a second PRS, from UE B, and proceeds, at 940, with the RTT determination. FIG. 9B shows the operation of UE B. At 950, it obtains a positioning configuration; it receives, at 955, an indication to select a PRS from UE A; it performs measurements, at 960; at 965, it determines whether a suitable resource has been found; if it has not, it reports failure, at 970, to UE A. If, at 965, UE B determines that a suitable resource has been found, it reports success, at 975, to UE A; it receives a PRS, at 980, from UE A; it transmits, at 985, the PRS; and it proceeds, at 990, with the RTT determination.

Figure 10A:
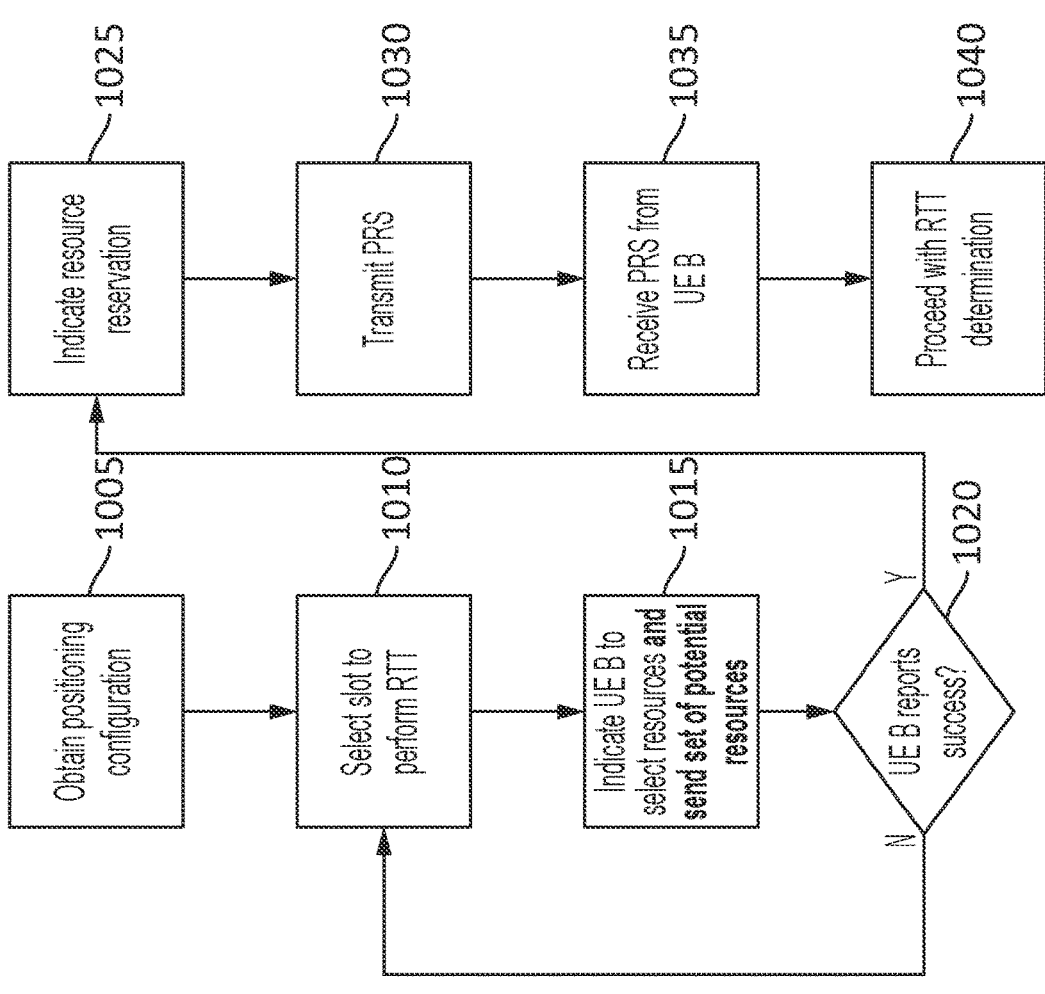
FIG. 10A illustrates UE operation for resource selection with inter-UE coordination, according to an embodiment.
Figure 10B:
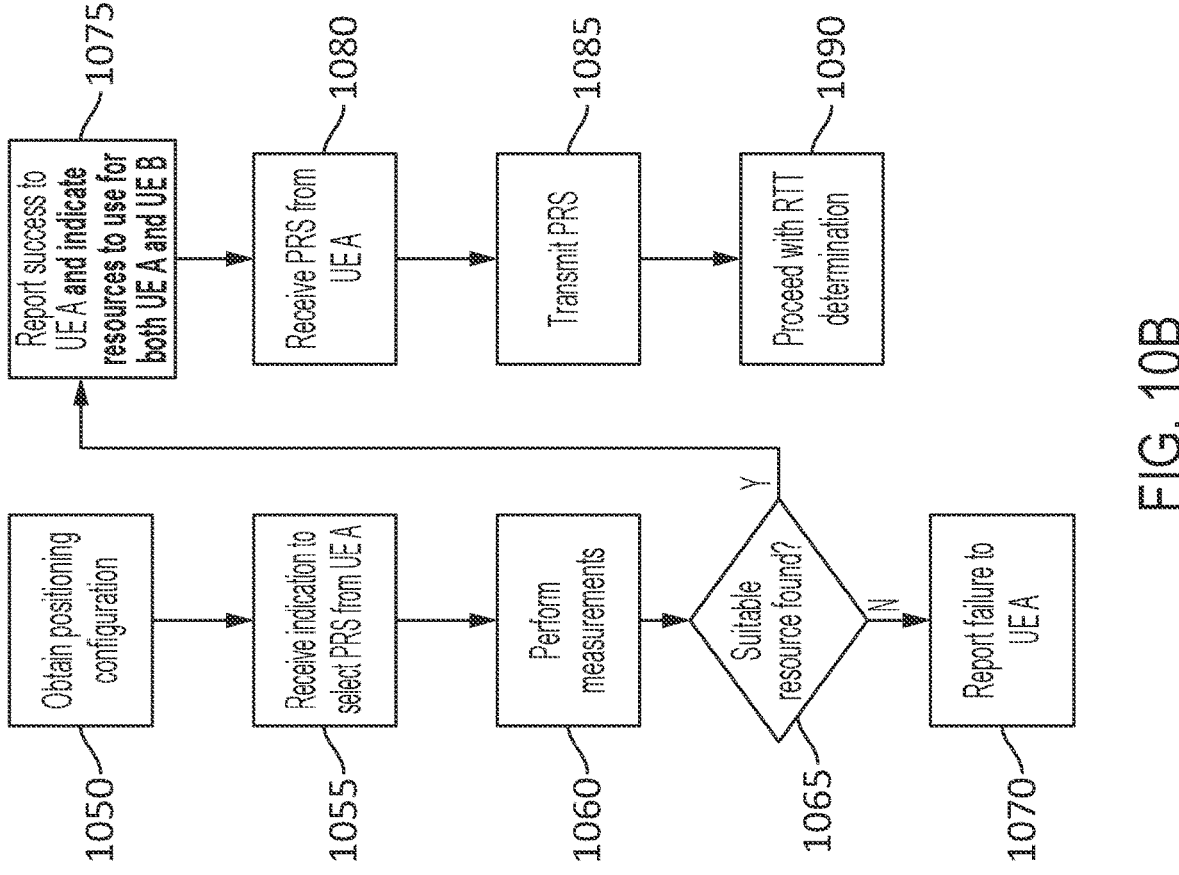
FIG. 10B illustrates UE operation for resource selection with inter-UE coordination, according to an embodiment.

FIGS. 10A and 10B show an embodiment in which inter-UE coordination has an impact on the UE operations when selecting the resources for reference signals transmission. FIG. 10A shows the operation of UE A. At 1005, it obtains a positioning configuration; at 1010, it selects a slot to perform RTT; at 1015, it indicates UE B to select resources and sends a set of potential resources; and at 1020, it determines whether UE B has reported success (if not, it returns to 1010; if so, it proceeds to 1025. At 1025, it indicates a resource reservation; at 1030, it transmits a PRS; at 1035, it receives a PRS from UE B, and at 1040, it proceeds with RTT determination. FIG. 10B shows the operation of UE B. At 1050, it obtains a positioning configuration; at 1055, it receives, from UE A, an indication to select a PRS; at 1060, it performs measurements; at 1065, it determines whether a suitable resource has been found; if it has not, it reports failure, at 1070, to UE A. If, at 1065, UE B determines that a suitable resource has been found, it reports success, at 1075, to UE A, and indicates the resources to use for both UE A and UE B. It receives a PRS, at 1080, from UE A; it transmits, at 1085, the PRS; and it proceeds, at 1090, with the RTT determination. While the process here is described with UE A guiding UE B, in some embodiments or circumstances UE B guides UE A instead, in an analogous manner.

Two aspects to consider are how to perform the following: (i) how UE B selects the resources and transmit the success/failure of PRS resource acquisition to UE A when the resources within Zone 2 are selected by UE B, and (ii) how UE A may convey the selected resources within Zone 2 on which UE B is expected to transmit the positioning reference signal when the resources are selected by UE A.

The details of the above two aspects are discussed below. Transmission with or without a subzone configuration for PRS may be used. Transmission with subzone configuration for PRS may proceed as follows, with steps including (i) obtaining positioning configuration (ii) requesting for positioning to a neighboring UE (iii) selecting a slot to perform RTT (iv) UE A either Indicating UE B to select resources or providing a set of resources to UE B for sending its RS (v) UE B performing measurements (vi) UE B reporting success or failure (vii) rejection of resources selected by UE B, (viii) UE A indicating resource reservation, and (ix) remaining operations from UE A and UE B.

Obtaining positioning configuration may proceed as follows. Both UE A and UE B may need to obtain the configuration of the positioning slot. In one embodiment, the positioning slots are within a special resource pool. In such a case, the UE may need to obtain the resource pool configuration. In addition, the UEs may need to know the subzone configurations (Z1 and Z2), which may be signaled by indicating which symbols are occupied by each subzone. The positioning configuration may be (pre-)configured by RRC signaling.

Requesting for positioning to a neighboring UE may proceed as follows. Once positioning configuration is obtained, an NR UE may trigger sidelink positioning with a neighboring UE based on a request from higher layers. For example, if a UE identifies the presence of a neighboring UE within close proximity (e.g., after receiving the Basic Safety Message (BSM)), it may trigger sidelink positioning to obtain a higher accuracy.

Once sidelink positioning is triggered, a UE may send a request to a neighboring UE to trigger sidelink positioning. This request may be either targeted to a specific UE (e.g., by indicating the target UE ID) or it may be sent to all neighboring UEs within a specific range (e.g., by indicating its location and a specific range similar to groupcast option 1). This triggering may be either sent in the 1st or 2nd stage SCI or as a MAC CE or by using RRC signaling. Alternatively, it may be carried in the physical sidelink feedback channel to preserve resources by using a specific offset.

The triggering for sidelink positioning may also include a flag to indicate the need for resource selection assistance. In particular, UE B may request sidelink positioning from a neighboring UE A with a flag indicating that UE A should perform sensing and accordingly provide a set of candidate resources that may be used by UE B for sending its reference signals as is discussed in more detail below.

Selecting a slot to perform RTT may proceed as follows. Once UE A has decided to perform RTT, it may need to select resources to send its own PRS. UE A then senses the potential PRS resources to find one. UE A may only select a resource in Z1, and thus, to some extent, may ignore Z2. In particular, UE A may perform sensing based on the received SCIs for its neighbors along with the measured RSRP to identify which resources within Z1 are reserved. In this case, if a future resource within Z1 is reserved by a neighbor and the measured RSRP is above a threshold then this resource is considered as occupied. This threshold may be configured per resource pool and may be dependent on priority. For example, a reservation by a neighboring UE with a higher priority as indicated by the SCI may have a lower occupancy threshold to prevent neighboring UEs for selecting the same resource and accordingly avoid a collision.

In other embodiments, UE A may also take into account Z2, because UE B will need to select a resource within Z2. Thus, UE A may also evaluate whether there are available resources for resource selection in Z2. UE A may use a different set of thresholds when evaluating Z2 based on the received SCI for its neighbors and their measured RSRP levels. This option is particularly attractive if UE A and UE B are in close proximity to each other, since a resource suitable for UE A is likely to be suitable for UE B as well. This may also help in resolving the hidden node problem since the sensing will be done by the Rx UE similar to the approach used in Rel-17 for resource selection assistance.

UE A either indicating UE B to select resources or providing a set of resources to UE B for sending its RS may proceed as follows. Once UE A has selected resources, it indicates to UE B which resources it has selected, and possibly, where UE B needs to select resources. This indication may be made in several ways, including (i) RRC signaling if there is no urgency to perform the RTT evaluation (e.g., in case of a periodic measurements of UE positions); (ii) MAC CE; or (iii) a SCI, either in first or second stage. UE A may need to indicate the following: (i) its selected resource (time and frequency, as well as potential future reservations, including periodicity); (ii) Which resources UE B needs to evaluate/use: this may be, according to the degree of control from UE A: (1) The exact set of resources UE B needs to use (time, frequency, periodicity) or (2) that UE needs to select resources in Z2, potentially indicating the periodicity; and (iii) whether UE B needs to sends a success/failure indication to UE A, or if UE A assumes success for UE B. The third indication may be optional, or it may be configured by higher layer signaling before this actual procedure, and there may be no need to send anything. In the remainder of this disclosure, it is assumed without loss of generality that UE B will send a report of success or failure.

When UE A sends its selected resource to UE B (i.e., time and frequency, as well as potential future reservations, including periodicity), it may use the TRIV (Time Resource Indicator Value), FRIV (Frequency Resource Indicator Value) and Period fields in the 1st stage SCI. In addition, when the resources are selected by UE B for its RS transmission, UE A may also indicate to UE B that it needs to select a set of resources for its RS transmissions. This indication may be done either implicitly (i.e., by setting one or more fields of the $2^{nd}$ stage SCI to specific values) or explicitly (e.g., by using a new $2^{nd}$ stage SCI format). Alternatively, it may also use a MAC CE to indicate the need for UE B to select resources for its RS transmission. Alternatively, UE A may perform resource sensing and accordingly provide guidance to UE B in the form of a preferred or a non-preferred resource sets as follows.

Providing a preferred set may be beneficial when UE B cannot perform sensing for resource selection. In this case, UE A may perform sensing and send a set of preferred resources that may be used by UE B for transmitting its reference signals to UE A. Subsequently, once UE B receives this set, it may use it along with its own measurements (if they exist) to obtain a final set of candidate resources that will be passed to the higher layer for resource selection. This set of resources may be either carried in the $2^{nd}$ stage SCI to reduce latency when the number of candidates is small (e.g., below 3) or it may be sent by using a MAC CE when the number of candidates is large. To achieve a fast RTT, UE B might be required to select a resource from a set of resources in Zone 2 that all fall within the same slot in which UE A intends to send its reference signal. Alternatively, the set of candidate resources may be selected such that they fall within X number of slots from the slot in which UE A sent its reference signal where X is configured per resource pool.

Providing a non-preferred set may be beneficial only when UE B may perform sensing for resource selection. In this case, UE A may perform sensing and accordingly provide a set of resources that are not to be used by UE B to avoid collisions with the neighbors of UE A (e.g., due to the hidden node problem).

UE B performing measurements may proceed as follows. Once UE B has received the indication from UE A, it may perform measurements to find a suitable resource. This is optional for the case where UE A directly indicates to UE B to use a specific set of resources (e.g., when a set of preferred resources is already provided by UE A). Otherwise, UE B attempts to find a suitable resource within Z2. It performs the regular sensing procedure over Z2, but may use different thresholds than UE A uses for Z1. In some cases, UE B may not find any suitable resource. In some cases, it may be assumed that UE B will always find a suitable resource (e.g., if no suitable resource exists per the sensing algorithm, UE B may opt to use the best available resource nonetheless similar to what is done in the Mode 2 resource selection procedure by iteratively increasing its RSRP occupancy thresholds).

UE B reporting success or failure may proceed as follows. Based on the results of the previous steps, UE B reports either success or failure to UE A. This may enable the fast RTT since UE A will need to be aware of which resources will be used by UE B for sending its reference signal. This may be done using RRC signaling, MAC CE or SCI or by using the PSFCH. In particular, UE B may send a SCI indicating its future resource that it has selected within Z2 to transmit its reference signal. In this case, the SCI may carry the ID of UE A, the selected slot or subchannel resource over which the UE intends to transmit its reference signal (i.e., the same ones selected by UE A to indicate a success or a different one to indicate failure) as well as the selected resource to be used by UE B within Zone 2. In this case, the success indication may be implicit. Alternatively, UE B may also provide an explicit indication of success or failure by adding a 1-bit field to the $1^{st}$ or $2^{nd}$ stage SCI or by using a MAC CE.

Based on this report, if there is a failure indication from UE B, UE A selects another resource. UE B may also provide a possible alternative resource to be used by UE A based on its sensing to avoid the hidden node problem. For example, UE B may include in its failure indication either a specific future resource or a set of candidate resources that it intends to use which may be used by UE A based on sensing from UE B's perspective.

In another embodiment, UE B may use the PSFCH to either indicate a success or failure to UE A. In particular, based on the resources selected by UE A, UE B may perform its sensing and evaluations and accordingly send a PSFCH sequence to either indicate a success or failure (e.g., by using a specific PSFCH resource to indicate a success and another one to indicate a failure). Once a failure is received by UE A, a resource reselection may be triggered by UE A.

Rejection of resources selected by UE B may proceed as follows. In some cases, UE A might be required to indicate the presence of a resource selection conflict to UE B after it has received a success. For example, due to the hidden node problem, UE B might have selected a resource, for sending its reference signals, that is already occupied by a neighboring UE C that is close to UE A. This is explicitly beneficial when UE A does not provide a set of candidate resources for UE B or when the selected resource is far in the future. To indicate the conflict, one possibility is to use the physical sidelink feedback channel. In particular, once UE B reports its success and indicates the selected resource, UE A may respond with a PSFCH transmission to trigger a resource reselection at UE B. The specific PSFCH resource used to indicate the conflict may be either related to the resource over which the SCI is transmitted that carries the reservation or related to the resources that will be used to send the actual reference signal (the selection between the two may be based on resource pool configuration). The trigger for resource selection by UE B may also be carried either in the $1^{st}$ or $2^{nd}$ stage SCI or as a MAC CE at the expense of higher latency.

UE A indicating a resource reservation may proceed as follows. PRS resource reservation negotiations may be done through RRC between UE A and UE B. Once the resource is reserved, its reservation may be signaled through PSCCH. There are several possibilities, including two possibilities referred to herein as Option 1 and Option 2. In Option 1, UE A indicates the reservation for both UE A and UE B in a single, joint SCI. In Option 2, both UE A and UE B indicate their individual reservations in separate SCIs. Option 1 reduces overall signaling. Option 2 may be less burdensome for other UEs performing sensing. This reservation may be considered as optional since the reservation of resources was also announced to the neighbors during negotiations. However, there are cases in which this is beneficial, for instance when the selection of resources is done by RRC signaling between UE A and UE B.

Remaining operations from UE A and UE B may proceed as follows. The remaining operations may include the following. UE A performs the PRS transmission and UE B measures, then UE B performs the PRS transmission and UE A receives the PRS. The measurement of the UE Rx–Tx time difference may then be performed by both UE A and UE B.

Transmission without subzone configuration for PRS may proceed as follows. In this case, the resource selection is for the case where only PRS is sent (i.e., no data is transmitted).

Transmission with subzone configuration for PRS is described above for the case in which there is a specific PRS resource pool for the positioning slots with subzone configuration. It is also possible to have the positioning slots without any subzone configuration. In such a case, most of the resource selection protocol described above applies. However, some limited changes may be necessary. For example, the target UE which sends the positioning request will have lower priority on the resource selection than the anchor UE. Subsequently, the target UE will be required to perform a resource reselection in case of a resource selection conflict.

In this situation, a unique problem may occur: in a given slot, two UEs may simultaneously transmit. However, the current sensing procedures only apply for single-UE transmission in a given slot. Thus, a UE C attempting to select resources may need to be aware that two UEs are transmitting in the same slot. The following may be done. (i) Both UE A and UE B send an SCI. The SCI may be sent on colliding resources or different resources, depending on the user case. The SCIs may also be sent on different resources but indicating the same future resource as reserved. A UE C would then apply the usual sensing procedures and would most likely detect this resource as occupied. (ii) After the sensing, UE A sends its resource allocation to UE B through SCI or MAC CE or RRC. (iii) UE B may perform the resource reselection to exclude the resources occupied by UE A. (iv) A flag may be added in the SCI to indicate that the resource cannot be selected. In such a case, a single UE (e.g., UE A) may send the SCI. In the first stage (or even the second stage), a flag may indicate that either (a) no UE may select the slot, or (b) the slot is used for positioning, and more than one UE is transmitting. In some cases, this might simply be done by having the resources selected for positioning have higher priority. (v) UE B performs reselection of resources based on SCI from UE A.

In some embodiments, instead of UE A directing, as discussed above, the resource allocation for UE B, the gNB allocates resources for both UE A and UE B. For sidelink resource allocation mode 1, the gNB determines resources for UE A and UE B. In this case, once sidelink positioning is required, either UE A or UE B may send a request for resource allocation for positioning reference signals to the gNB. For example, UE A may send the request to the gNB and indicate that the target Rx UE is UE B. Subsequently, the gNB may respond back by using a DCI indicating the resource reservation. Both UE A and UE B decode the DCI sent by gNB, and determine the associated PRS resource allocation. The PRS resource configuration is given by the higher layers through MAC CE or RRC. In case of conflicts (e.g., a failure to transmit or a collision with a neighboring UE), a NACK may be sent to the gNB to request additional resources.

A definition of UE Tx–Rx time difference may be as follows. By using Scheme A, the latency for positioning measurement may be restricted within 1 ms. For a UE with mobility of 250 km/h, the max error for measurement is 0.07 m. For a UE with a clock error of ±0.1 PPM, the max error for measurement is 0.015 m.

In NR positioning, the UE Rx–Tx time difference is defined as $T_{UE\text{-}RX} - T_{UE\text{-}TX}$ for Multi-RTT (see TS38.215), where $T_{UE\text{-}RX}$ is the UE received timing of downlink subframe #i from a Transmission Point (TP), defined by the first detected path in time, and $T_{UE\text{-}TX}$ is the UE transmit timing of uplink subframe #j that is closest in time to the subframe #i received from the TP.

For sidelink positioning, the UE Rx–Tx time difference may be defined as the difference between UE received timing of sidelink PRS (SL-PRS) and UE transmitted timing of SL-PRS. Specifically, the UE Rx–Tx time difference for sidelink positioning is defined as follows:

$T_{UE\text{-}RX}$ is the UE received timing of a first set PRS symbol of a first set sidelink subframe (e.g., the PRS symbol #m of sidelink slot #i) from a transmitting UE, defined by the first detected path in time.

$T_{UE\text{-}TX}$ is the UE transmit timing of a second set PRS symbol of a second set sidelink subframe (e.g., the PRS symbol #n of sidelink subframe #j) and is closest in time to the first set PRS symbol (e.g., to the PRS symbol #m of subframe #i received from the transmitting UE). As used herein, a "set" value (such as m, i, n, and j in the definitions above) is a value that is available to the UE (e.g., as a result of RRC configuration information received from the gNB, or as a result of the value having been stored in the UE in compliance with the standard) at the time of making a calculation that uses the value.

In Scheme B, as mentioned above, UE A and UE B transmit the PRS in the adjacent slots. The PRS resources may be in different slots for a FRTT method. For example, both UE A and UE B may transmit the PRS in adjacent slots. While not as accurate as the single-slot method, this has the advantage of not requiring a redesign of a slot, and involves only one UE transmitting in a given slot (i.e., there exists a single zone with a slot to transmit the reference signal). Thus, while Scheme B is not necessarily suitable for extremely high mobility scenarios, there are many scenarios in which this scheme makes sense.

In general, the same methods as described above for Scheme A may be used. In some embodiments, the methods are modified as follows. Once UE A has selected resources, it indicates to UE B which resources it has selected, and possibly, where UE B needs to select resources. In an algorithm presented above, UE A indicates a single slot in which UE A and UE B will transmit. Here, the difference is that UE A indicates a slot where only UE B will transmit (e.g., the adjacent slot). In some cases, UE A may instead indicate a duration and let UE B choose to transmit the PRS in any slot within that duration.

This indication may be made in several ways, including (i) RRC signaling if there is no urgency to perform the RTT evaluation, (ii) MAC CE, or (iii) a SCI, either in first or second stage. UE A may need to indicate the following: (i) its selected resource (time and frequency, as well as potential future reservations, including periodicity); (ii) In which slot(s) UE B needs to select the PRS; and (iii) whether UE B needs to sends a success/failure indication to UE A, or if UE A assumes success for UE B. The third indication may be optional, or it may be configured by higher layer signaling before this actual procedure, and there may be no need to send anything.

Two types of resource allocation may be used for PRS in adjacent slots, referred to herein as Option 1 and Option 2. In Option 1, the PRS resources are pre-configured by higher-layer signaling (e.g., RRC signaling). This information may be included in IE NR-SL-PRS-Info, which may include the PRS frequency and time location information, PRS muting configuration, PRS frequency hopping configuration, etc. Once the PRS resource allocation including the slot structure and the number of slots for PRS is (pre-)-determined, it will not change until there is a re-configuration message sent by the higher layer signaling.

In Option 2, the PRS resources are determined by SCI sent from one UE (e.g., from UE A or the Anchor UE).

Option 2 may use a new SCI format, including the following parameters: (i) number of slots, (ii) the slot index for UE A and UE B, (iii) start symbol and length, and (iv) PRS frequency and time resource allocation information. To reduce the likelihood of collisions, UE A may also assist UE B in selecting the resources for transmitting the RS. This is extremely beneficial to resolve the hidden node problem. In this case, instead of just providing a duration within which it expects UE B to transmit, it may also provide a set of candidate resources (i.e., a preferred resource set) that UE B may use to send its RS. In this case, if UE B is capable of performing sensing it may use the intersection set between its sensing results and the candidate set provided by UE A when selecting the resource for its upcoming transmission.

Alternatively, UE A may also provide a set of non-preferred resources in which it detected a conflict. Subsequently, UE B is expected to exclude these resources when performing its resource selection for sending its positioning reference signal. Finally, a candidate resource within a set may consist of a time slot, one or more subchannels, or an RS index in case RSs of multiple UEs are being multiplexed.

Figure 11:
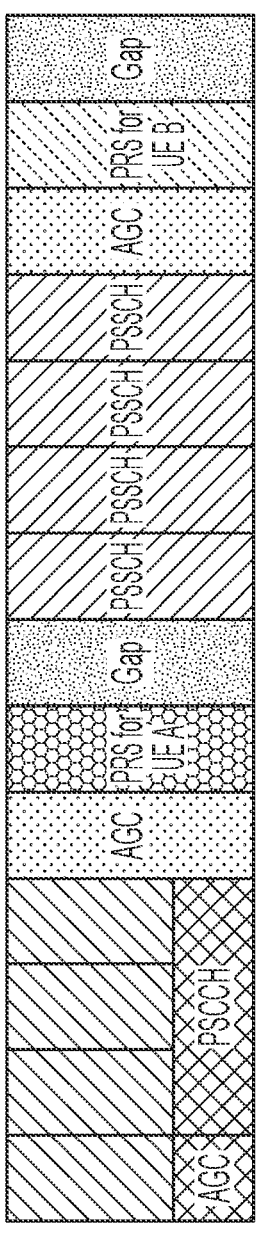
FIG. 11 illustrates a slot format, according to an embodiment.

Positioning measurement and reporting may proceed as follows. The UE Rx–Tx time measurement for FRTT may be reported either in the same slot as PRS transmission or in a different slot after the PRS transmission. If the measurement is reported in the same slot as PRS resources, the SL-PRS slot format with SCI should be applied. The UE Rx–Tx time measurement is then carried on the PSSCH symbols. One example of the slot format for measurement reporting within the same slot as PRS resources is shown in FIG. 11. The slot structure in FIG. 11 applies to all the subchannels within the slot to avoid the AGC issues. The UE which sends the PSCCH will send the PSSCH as well.

In any case, resources in which the measurements will be reported may need to be determined. Another possibility to achieve this is that the SCI sent along with the PRS sent by UE A may indicate a future resource reservation that is X slots away with an indication that this future resource will carry the reporting resources. In particular, $1^{st}$ or $2^{nd}$ stage SCI may include a 1-bit flag to indicate that the future resource reservation is used for reporting and accordingly UE B will be aware of the exact resource carrying the reporting information. This indication may also be done implicitly by setting one or more fields on the SCI to specific values.

Doppler shift compensation may proceed as follows. In addition to clock drift and mobility impairments, the UE's relative speed may also create a frequency shift due to the Doppler effect. Fortunately, this effect is easy to compensate: the UEs each know their speeds and direction, thus may derive their relative motion and speed, and determine the Doppler frequency shift. When performing the measurements on the PRS, the UE may then compensate for the Doppler shift. The UE may obtain the information of relative speed of other UEs from either the basic safety message (BSM) information or some other sources. With the relative speed information, the UE may compensate the Doppler shift for high mobility scenarios.

Double sided RTT for clock shift mitigation may proceed as follows.

Figure 12A:
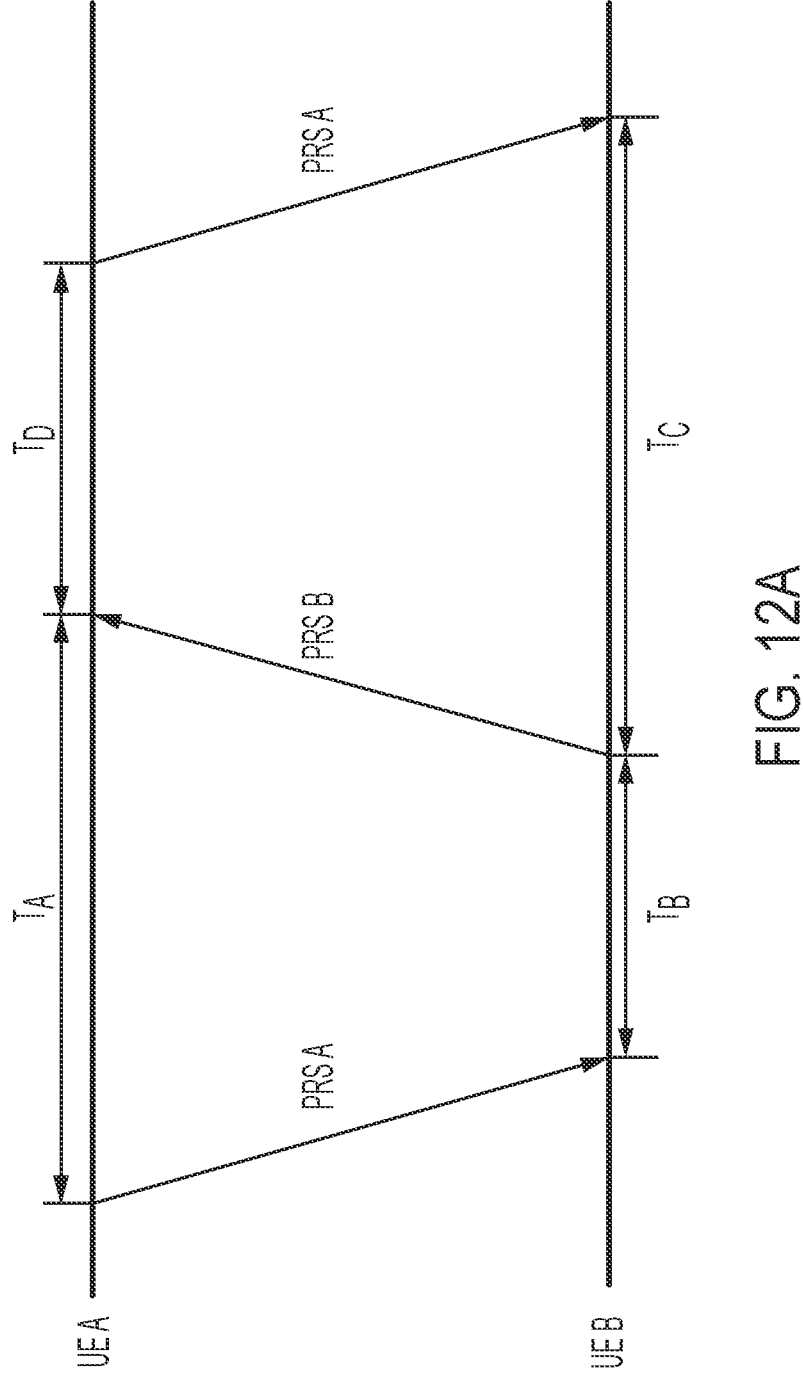
FIG. 12A illustrates a double sided round trip time measurement, according to an embodiment.
Figure 12B:
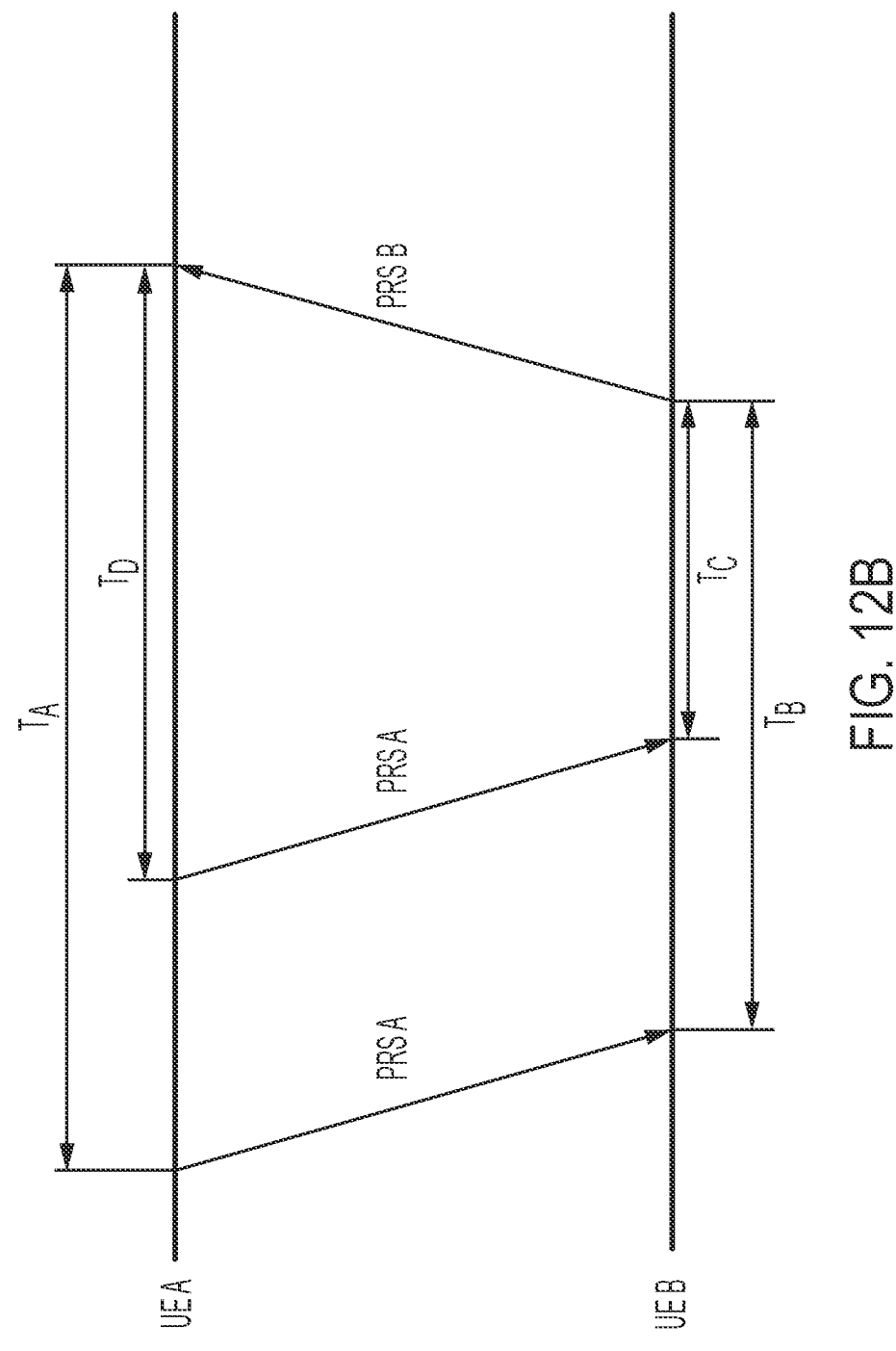
FIG. 12B illustrates a double sided round trip time measurement, according to an embodiment.
Figure 12C:
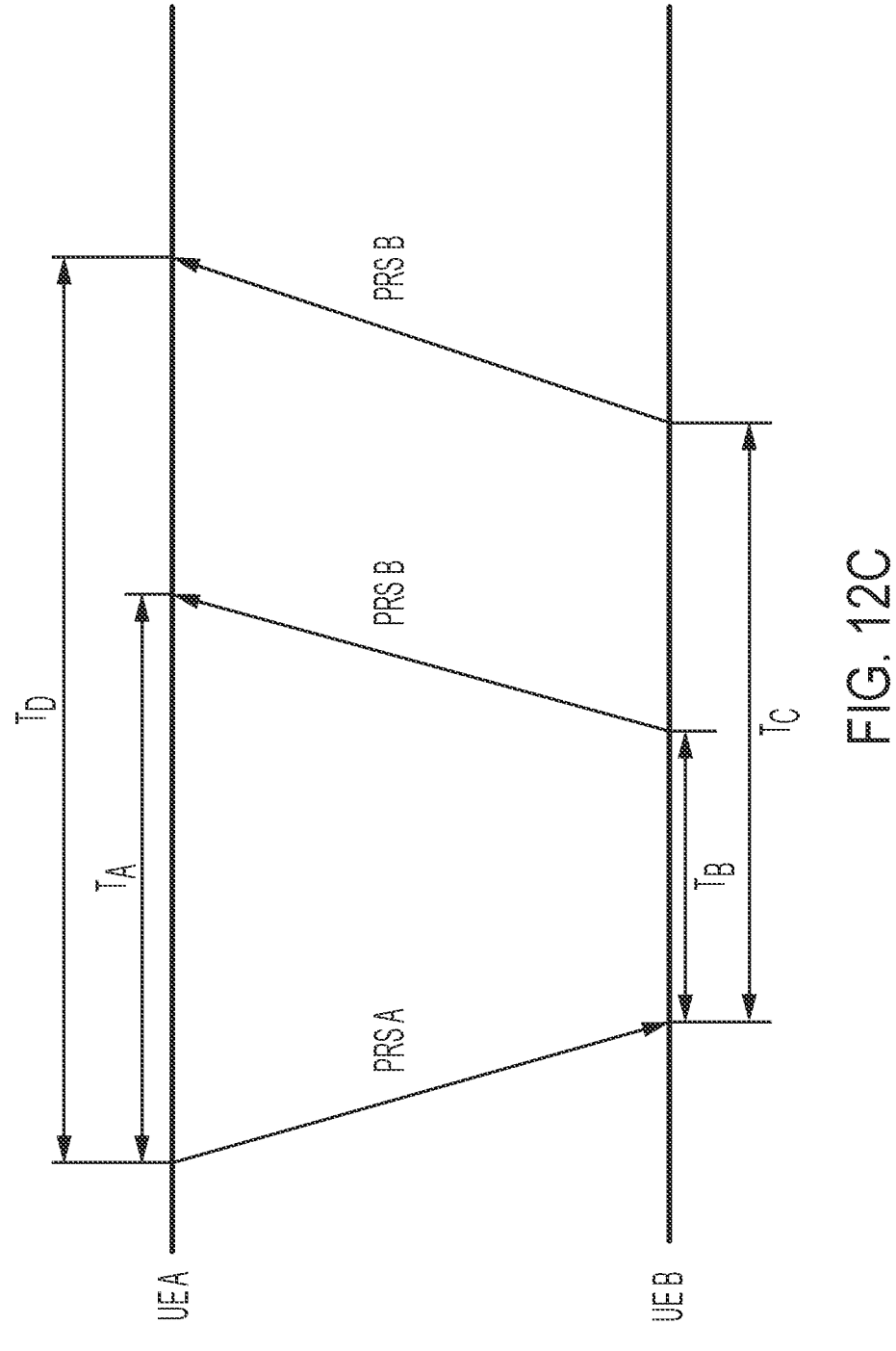
FIG. 12C illustrates a double sided round trip time measurement, according to an embodiment.

As it is shown above, in the discussion of double-sided RTT, a double-sided RTT method may mitigate the impact of clock drift at the UEs. Each of FIGS. 12A and 12B shows three PRS transmissions. The SCI may include resource allocation information for all three of these PRS transmissions; two of the PRS transmissions may be for transmission by (and may be transmitted by) UE A, and the remaining PRS transmissions may be for transmission by (and may be transmitted by) UE B. FIG. 12C also shows three PRS transmissions, two of which are for transmission by (and are transmitted by) UE B; the remaining PRS transmissions is for transmission by (and is transmitted by) UE A.

In FIG. 12A, the propagation delay T may be estimated by two UE time measurements as $$T = \frac{1}{4}[(T_A - T_B) + (T_C - T_D)] = \frac{1}{4}[(T_A - T_D) + (T_C - T_B)].$$

By taking the clock drift of UE A and UE B into account, the resulting propagation delay is:

$$\hat{T} = \frac{1}{4}[(T_A - T_D)(1 + e_A) + (T_C - T_B)(1 + e_B)]$$

where $e_A$ and $e_B$ are the clock drifts at UE A and UE B, respectively.

Then the error of propagation delay estimation with clock error by double-sided RTT method may be:

$$\text{error} = \hat{T} - T = \frac{1}{4}[e_A(T_A - T_D) + e_B(T_C - T_B)]$$

Replacing $T_A = T_B + 2T$ and $T_C = T_D + 2T$, results in $$\text{error} = \hat{T} - T = \frac{1}{4}[e_A(T_B + 2T - T_D) + e_B(T_D + 2T - T_B)] =$$

$$\frac{1}{4}(T_B - T_D)(e_A - e_B) + \frac{1}{2}(e_A + e_B)T \approx \frac{1}{4}(T_B - T_D)(e_A - e_B)$$

where
$e_A$ and $e_B$ are the clock offset of UE A and UE B, and T is estimated propagation delay between UE A and UE B without clock drift.

In the above equation, the dominant term for the error is $$\frac{1}{4}(T_B - T_D)(e_A - e_B).$$

Figure 13:
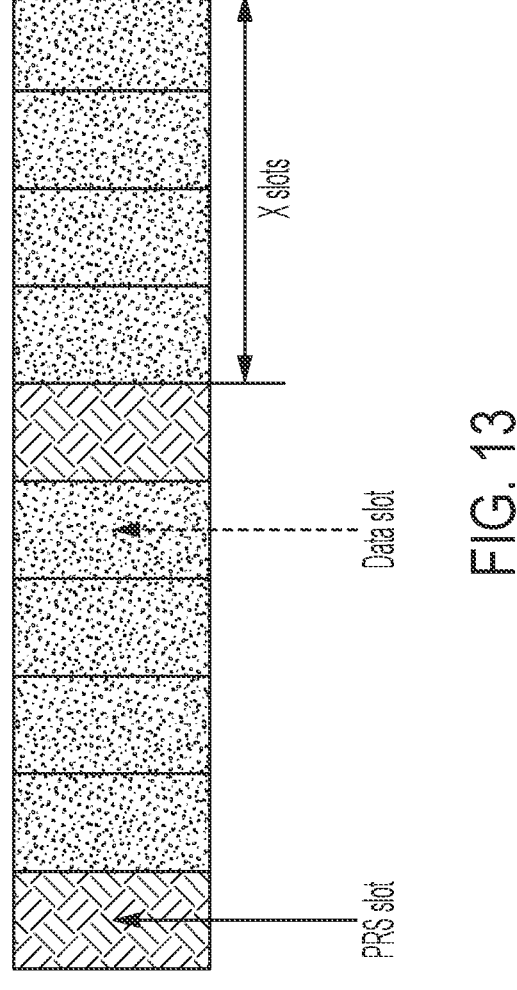
FIG. 13 illustrates a slot structure for double-sided round trip time measurement, according to an embodiment.

To reduce the error, the difference between two UE Rx–Tx time difference measurements may be made small. To achieve this goal, the slot structure for a double sided RTT method shown in FIG. 13 may be employed to ensure that $T_B \approx T_D$. For this purpose, both UEs may send the PRS reporting after the same time offset. For instance, if UE A reports the PRS measurement two slots after the PRS transmission, UE B may do the same. This offset value may be known a priori, and may be any of the following. (i) (Pre-)configured by RRC signaling. For instance, it may be (pre-)configured on a per-resource pool basis. (ii) Negotiated between both UEs. (iii) Selected by one UE (e.g., UE A) and indicated in the SCI.

In low mobility conditions, the two PRS transmissions do not need to be extremely close to each other since the only compensation to do is for the clock drift. If high mobility is present, the two PRS transmissions may need to be close to each other. Thus, the following structure may be beneficial. One PRS slot or a group of consecutive PRS slots is or are followed by a few data slots (with fewer data slots enabling the PRS to be transmitted close to each other).

In order to maximize efficiency, the number of data slots may be fixed to X slots, where X is the offset between the time offset for reporting, i.e., the number of consecutive slots for measurement reporting, and may be chosen from 0, 1, 2, ... N, and X=0 means that there is no data slot between the two PRS slots. The duration of data slots should be selected such that UE A (or UE B) may successfully decode the received data including the UE Rx–Tx time difference measurement sent from the other UE. The value X may be the same for both UEs, and may be indicated or (pre-) configured.

The PRS periodicity may be the same for UE A and UE B. The UE A and UE B may negotiate the periodicity of the PRS during the resource selection procedure. After that both of the two UEs may use the same periodicity for PRS transmission.

Speed compensation may proceed as follows. Another approach to correct mobility is to have the receiver compensating for the speed: unlike for the Uu link, on the sidelink, at least Vehicle-to-everything (V2X) UEs are aware of their location, speed, and direction. A Rel-14 LTE UE broadcasts its location, speed, and heading in periodic messages, such as the Basic Safety Message (BSM). Thus, all UEs receiving BSMs are aware of their neighbors's speed and heading. NR UEs are aware of the BSM messages, either because they receive it over LTE, or because they are transmitted over NR links as well.

If the UE is aware of the neighboring UE's heading and speed, it may then determine that UE's speed and direction, relative to its own. If two messages are sent at two different times with the RTT method (either single or double sided), the UE may then use the relative speed information to compensate for the UE's motion between the times at which these two messages are sent.

Figure 14:
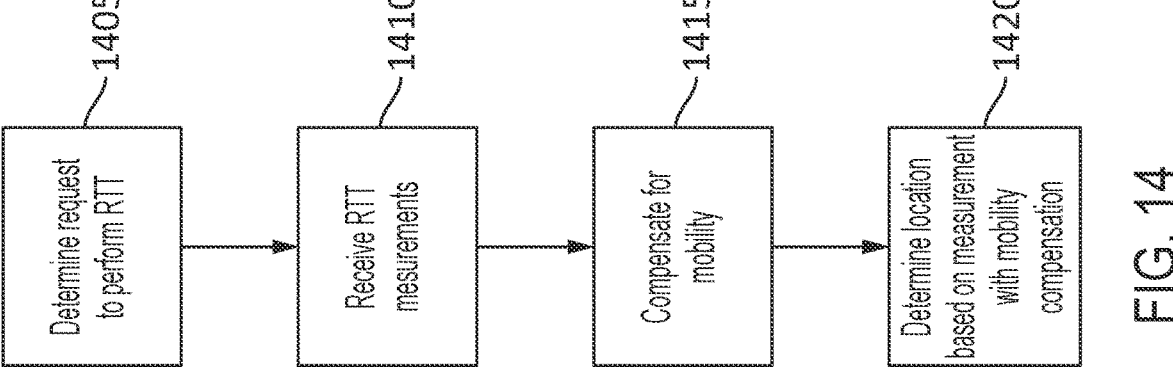
FIG. 14 illustrates a speed compensation operation, according to an embodiment.

Conceptually, the relative speed and direction may be viewed as a drift, and while physically different, may be mathematically modeled, and compensated for, in a manner similar to that used for clock drift. The general procedure is as shown in FIG. 14. In this procedure the UE determines, at 1405, a request to perform RTT; receives, at 1410, RTT measurements; compensates, at 1415, for mobility, and determines location, at 1420, based on a measurement with mobility compensation.

Figure 15:
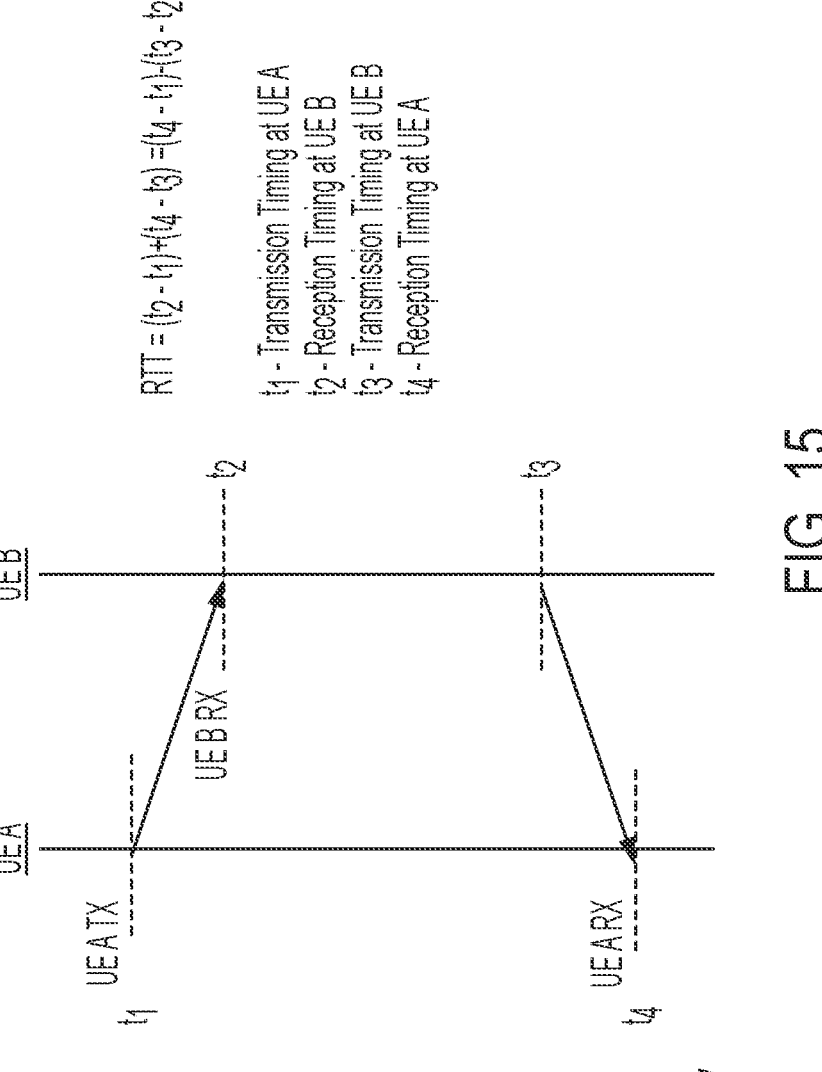
FIG. 15 illustrates a round trip time measurement principle, according to an embodiment.

Two methods may be employed to perform speed compensation. A first one of these methods is performed at the RTT source UE only. In this solution, the UE that initiates the RTT process is the one performing the compensation. As it is shown in FIG. 15, the receiving UE B transmits Rx–Tx time difference measurement $(t_3-t_2)$ and UE A compensates for mobility for both the Rx–Tx time difference $(t_3-t_2)$ measured at UE B and the Rx–Tx time difference $(t_4-t_1)$ measured at UE A. UE A may, e.g., compensate for mobility assuming that all the measurements took place at the time of measuring Rx timing $t_4$. With this solution, there is no need for a change in signaling. The UE A (or RTT source UE) behavior is modified so that it is allowed for UE A to compensate for mobility when performing location. For example, the UE may use any speed and direction information it has from the destination UE (i.e., UE B) to compensate for mobility during the RTT determination.

A second method may be performed both at the RTT source and destination UE. In such a case, the destination UE (UE B) reports the Rx–Tx time difference measurement $(t_3-t_2)$ with speed compensation already included. For instance, UE B may report the measurements assuming that it was already located where it was at the time when UE B measured Rx timing $t_3$. The UE, when reporting Rx–Tx time difference measurement $(t_3-t_2)$, may indicate whether or not it already compensated for speed.

FIG. 16 is a flowchart of a method, in some embodiments, transmitting, at 1602, by a first User Equipment (UE): a first Positioning Reference Signal (PRS) transmission, and, immediately preceding the first PRS transmission, a duplicate of a symbol of the first PRS transmission; transmitting, at 1604, by the first UE, to the second UE, a Physical Sidelink Control Channel (PSCCH) carrying a Sidelink Control Information (SCI), the SCI containing resource allocation information for the first PRS transmission; receiving, at 1606, by the first UE, resource allocation information from a network node, wherein the transmitting of the PSCCH includes generating the PSCCH based on the resource allocation information from the network node; transmitting, at 1608, by the first UE, a duplicate of a symbol of the PSCCH, immediately before the transmitting of the PSCCH; receiving, at 1610, by the first UE, from the second UE, a Physical Sidelink Control Channel (PSCCH) carrying a Sidelink Control Information (SCI), the SCI containing resource allocation information for the second PRS transmission; receiving, at 1612, by the first UE, the second PRS transmission from the second UE; not transmitting, at 1614, by the second UE, during a gap symbol, immediately after the second PRS transmission; not transmitting, 1616, by the first UE, during a gap symbol, immediately after the first PRS transmission; and calculating, at 1618 a receive-transmit time difference.

Figure 17:
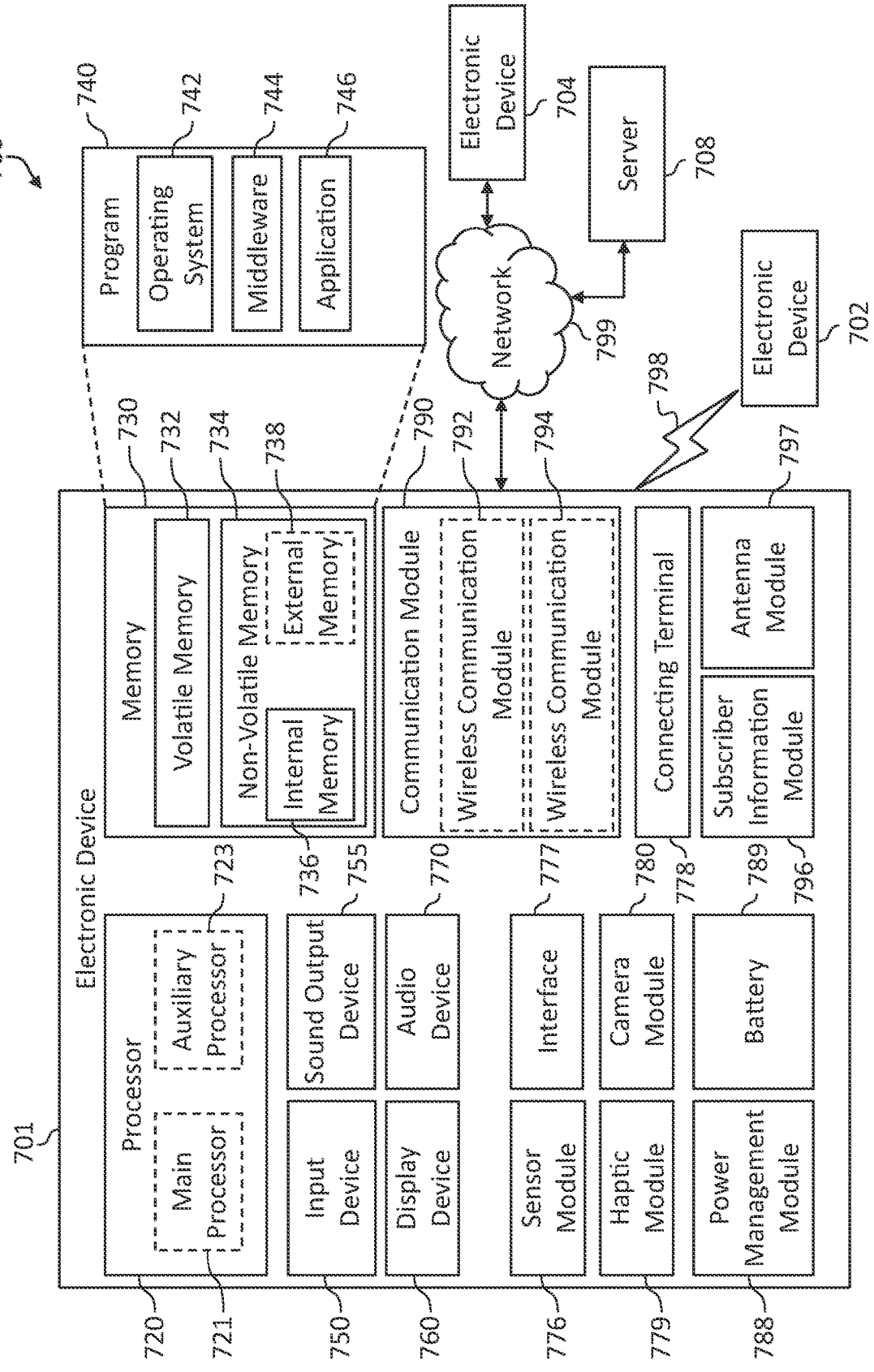
FIG. 17 is a block diagram of an electronic device in a network environment, according to an embodiment.

FIG. 17 is a block diagram of an electronic device 701 (such as a UE) in a network environment 700, according to an embodiment. The electronic device 701 may perform one or more of the methods disclosed herein. Referring to FIG. 17, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor (or means for processing) 720, a memory 730, an input device 740, a sound output device 755, a display device 760, an audio module 770, a sensor module 776, an interface 777, a haptic module 779, a camera module 780, a power management module 788, a battery 789, a communication module 790, a subscriber identification module (SIM) card 796, or an antenna module 794. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute software (e.g., a program 740) to control at least one other component (e.g., a hardware or a software component) of the electronic device 701 coupled with the processor 720 and may perform various data processing or computations.

As at least part of the data processing or computations, the processor 720 may load a command or data received from another component (e.g., the sensor module 746 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750 or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high-definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes. The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

In some embodiments, a UE includes a processing circuit or means for processing configured to perform one of the methods disclosed herein. Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

US 12,652,639 B2

25

What is claimed is:

1. A method, comprising:
transmitting, by a first User Equipment (UE):
a first Positioning Reference Signal (PRS) transmission, and,
immediately preceding the first PRS transmission, a duplicate of a symbol of the first PRS transmission,
the duplicate and the first PRS transmission being in a same slot as:
a second PRS transmission, multiplexed in time with the first PRS transmission, transmitted by a second UE, and,
immediately preceding the second PRS transmission, a duplicate, of a symbol of the second PRS transmission, transmitted by the second UE.

2. The method of claim 1, further comprising transmitting, by the first UE, to the second UE, a Physical Sidelink Control Channel (PSCCH) carrying a Sidelink Control Information (SCI), the SCI containing resource allocation information for the first PRS transmission.

3. The method of claim 2, further comprising receiving, by the first UE, resource allocation information from a network node, wherein the transmitting of the PSCCH comprises generating the PSCCH based on the resource allocation information from the network node.

4. The method of claim 2, further comprising transmitting, by the first UE, a duplicate of a symbol of the PSCCH, immediately before the transmitting of the PSCCH.

5. The method of claim 4, wherein the first PRS transmission begins three symbols or four symbols or five symbols after the duplicate of the symbol of the PSCCH.

6. The method of claim 2, wherein the SCI further contains resource allocation information for the second PRS transmission.

7. The method of claim 2, wherein:
the SCI further contains resource allocation information for the second PRS transmission and for a third PRS transmission; and
the method further comprises transmitting, by the first UE, two consecutive receive-transmit time difference measurements.

8. The method of claim 7, wherein the first PRS transmission and the third PRS transmission are for transmission by the first UE and the second PRS transmission is for transmission by the second UE.

9. The method of claim 7, wherein the first PRS transmission and the second PRS transmission are for transmission by the first UE and the third PRS transmission is for transmission by the second UE.

10. The method of claim 7, wherein the first PRS transmission is for transmission by the first UE and the second PRS transmission and the third PRS transmission are for transmission by the second UE.

11. The method of claim 2, further comprising receiving, by the first UE, from the second UE, a Physical Sidelink Control Channel (PSCCH) carrying a Sidelink Control Information (SCI), the SCI containing resource allocation information for the second PRS transmission.

12. The method of claim 1, further comprising receiving, by the first UE, the second PRS transmission from the second UE.

13. The method of claim 1, further comprising not transmitting, by the second UE, during a gap symbol, immediately after the second PRS transmission.

14. The method of claim 1, further comprising not transmitting, by the first UE, during a gap symbol, immediately after the first PRS transmission.

15. The method of claim 1, further comprising calculating a receive-transmit time difference as $T_{UE\text{-}RX}-T_{UE\text{-}TX}$, wherein:
$T_{UE\text{-}RX}$ is the UE received timing of a first set PRS symbol of a first set sidelink subframe from a transmitting UE, defined by the first detected path in time;
$T_{UE\text{-}TX}$ is the UE transmit timing of a second set PRS symbol of a second set sidelink subframe; and
the second set PRS symbol is closest in time to the first set PRS symbol.

16. A system, comprising,
a first User Equipment (UE), comprising:
one or more processors; and
a memory storing instructions which, when executed by the one or more processors, cause performance of:
transmitting, by the first UE:
a first Positioning Reference Signal (PRS) transmission, and,
immediately preceding the first PRS transmission, a duplicate of a symbol of the first PRS transmission,
the duplicate and the first PRS transmission being in a same slot as:
a second PRS transmission, multiplexed in time with the first PRS transmission, transmitted by a second UE, and,
immediately preceding the second PRS transmission, a duplicate, of a symbol of the second PRS transmission, transmitted by the second UE.

17. The system of claim 16, wherein the instructions, when executed by the one or more processors, further cause performance of transmitting, by the first UE, to the second UE, a Physical Sidelink Control Channel (PSCCH) carrying a Sidelink Control Information (SCI), the SCI containing resource allocation information for the first PRS transmission.

18. The system of claim 17, wherein the instructions, when executed by the one or more processors, further cause performance of receiving, by the first UE, resource allocation information from a network node, wherein the transmitting of the PSCCH comprises generating the PSCCH based on the resource allocation information from the network node.

19. The system of claim 17, wherein the instructions, when executed by the one or more processors, further cause performance of transmitting, by the first UE, a duplicate of a symbol of the PSCCH, immediately before the transmitting of the PSCCH.

20. A system, comprising,
a first User Equipment (UE), comprising:
means for processing; and
a memory storing instructions which, when executed by the means for processing, cause performance of:
transmitting, by the first UE:
a first Positioning Reference Signal (PRS) transmission, and,
immediately preceding the first PRS transmission, a duplicate of a symbol of the first PRS transmission,
the duplicate and the first PRS transmission being in a same slot as:
a second PRS transmission, multiplexed in time with the first PRS transmission, transmitted by a second UE, and,
immediately preceding the second PRS transmission, a duplicate, of a symbol of the second PRS transmission, transmitted by the second UE.

* * * * *